(12) United States Patent
Suga

(10) Patent No.: US 9,491,663 B2
(45) Date of Patent: Nov. 8, 2016

(54) WIRELESS COMMUNICATION SYSTEM, WIRELESS BASE STATION, WIRELESS TERMINAL, AND COMMUNICATION CONTROL METHOD

(71) Applicant: FUJITSU LIMITED, Kawasaki-shi, Kanagawa (JP)

(72) Inventor: Junichi Suga, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 22 days.

(21) Appl. No.: 14/171,385

(22) Filed: Feb. 3, 2014

(65) Prior Publication Data

US 2014/0148167 A1 May 29, 2014

Related U.S. Application Data

(63) Continuation of application No. PCT/JP2011/071445, filed on Sep. 21, 2011.

(51) Int. Cl.
*H04W 36/00* (2009.01)
(52) U.S. Cl.
CPC ..... *H04W 36/0005* (2013.01); *H04W 36/0083* (2013.01)
(58) Field of Classification Search
CPC .................................................. H04W 36/0005
USPC ......................................................... 455/436
See application file for complete search history.

(56) References Cited

U.S. PATENT DOCUMENTS 4,765,753 A * 8/1988 Schmidt ........................ 370/332
5,572,221 A * 11/1996 Marlevi et al. ................ 342/452
5,701,586 A * 12/1997 Tabbane et al. ............ 455/422.1
6,510,146 B1 * 1/2003 Korpela et al. ................ 370/332
6,556,834 B1   4/2003 Kobayashi et al.
6,885,866 B1 * 4/2005 Wikstedt et al. .............. 455/436
7,113,782 B2 * 9/2006 Lucidarme .................. 455/432.1
7,890,094 B2   2/2011 Iwamura (Continued)

FOREIGN PATENT DOCUMENTS

JP   2000-102057   4/2000
JP   2009-147920   7/2009

(Continued)

OTHER PUBLICATIONS

3GPP TR 36.902 v9.2.0 (Jun. 2010) 3rd Generation Partnership Project; Technical Specification Group Radio Access Network; Evolved Universal Terrestrial Radio Access Network (E-UTRAN); Self-configuring and self-optimizing network (SON) use cases and solutions (Release 9).

(Continued)

*Primary Examiner* — Justin Lee
(74) *Attorney, Agent, or Firm* — Fujitsu Patent Center

(57) ABSTRACT

A wireless terminal receives information about classes from a wireless base station which manages a class of a indicator used to determine a handover for the wireless terminal, transmits information about the indicator to the wireless base station when it is determined that the class of the indicator is changed to a different class on the basis of the received information about the classes, and does not transmit the information about the indicator to the wireless base station when it is determined that the class of the indicator is not changed on the basis of the received information about the classes.

11 Claims, 21 Drawing Sheets

(56) References Cited

U.S. PATENT DOCUMENTS

| | | | |
|---|---|---|---|
| 8,228,876 B2* | 7/2012 | Lim | 370/332 |
| 8,320,253 B2* | 11/2012 | Saitou | 370/235 |
| 8,355,722 B1* | 1/2013 | Tailor et al. | 455/436 |
| 8,457,318 B2* | 6/2013 | Gunther | 380/278 |
| 8,774,813 B2* | 7/2014 | Chan et al. | 455/445 |
| 8,781,391 B2* | 7/2014 | Huschke | 455/3.01 |
| 2003/0064730 A1* | 4/2003 | Chen et al. | 455/453 |
| 2005/0153705 A1* | 7/2005 | Gramakov et al. | 455/456.1 |
| 2005/0227694 A1* | 10/2005 | Hayashi | 455/436 |
| 2007/0060126 A1* | 3/2007 | Taniguchi et al. | 455/436 |
| 2007/0191013 A1* | 8/2007 | Gunnarsson et al. | 455/438 |
| 2007/0237101 A1* | 10/2007 | Cohen et al. | 370/310 |
| 2007/0275722 A1* | 11/2007 | Thorson et al. | 455/436 |
| 2008/0039089 A1* | 2/2008 | Berkman et al. | 455/436 |
| 2008/0070610 A1* | 3/2008 | Nishio | 455/509 |
| 2009/0036134 A1* | 2/2009 | Ryu et al. | 455/437 |
| 2009/0040983 A1* | 2/2009 | Kim et al. | 370/331 |
| 2009/0088157 A1* | 4/2009 | Aaron | 455/436 |
| 2009/0258650 A1* | 10/2009 | Lee et al. | 455/437 |
| 2010/0105377 A1 | 4/2010 | Iwamura et al. | |
| 2010/0105390 A1* | 4/2010 | Ishii | 455/436 |
| 2010/0130207 A1* | 5/2010 | Wu | 455/436 |
| 2010/0159927 A1* | 6/2010 | Toda et al. | 455/435.2 |
| 2010/0178922 A1* | 7/2010 | Han et al. | 455/436 |
| 2011/0051684 A1* | 3/2011 | Li et al. | 370/331 |
| 2011/0098034 A1 | 4/2011 | Iwamura | |
| 2013/0070679 A1* | 3/2013 | Wegmann et al. | 370/328 |

FOREIGN PATENT DOCUMENTS

| | | |
|---|---|---|
| JP | 2010-93639 | 4/2010 |
| WO | 2008084662 A1 | 7/2008 |

OTHER PUBLICATIONS

International Search Report, mailed in connection with PCT/JP2011/071445 and mailed Nov. 1, 2011.

JPOA—Office Action of Japanese Patent Application No. 2013-534504 dated Oct. 28, 2014, with partial English translation of relevant parts.

* cited by examiner

FIG. 5

| (Mn−Ms) | −2dB | −1dB | 0dB | 1dB |
|---|---|---|---|---|
| ADJACENT CELL B | UE_A | UE_B<br>UE_C | | UE_D |
| ADJACENT CELL C | UE_E | | UE_F | UE_G<br>UE_H |

FIG. 8

| (Mn−Ms) | −3dB | 0dB | 2dB | 3dB |
|---|---|---|---|---|
| ADJACENT CELL B | UE_A | UE_B<br>UE_C | | UE_D |
| ADJACENT CELL C | UE_E | | UE_F | UE_G<br>UE_H |

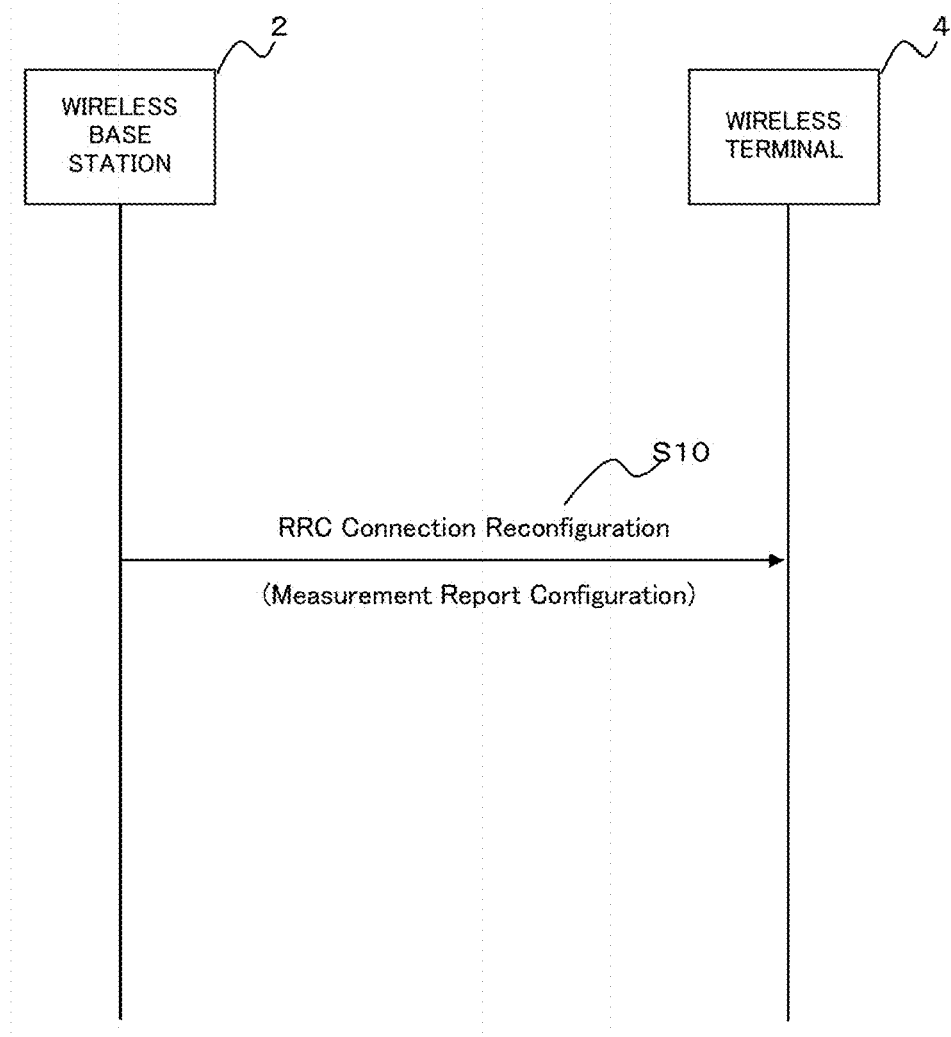

FIG. 10

MeasObjectMod

| PARAMETER | DESCRIPTION |
|---|---|
| measObjectID | ID OF MEASUREMENT TARGET |
| CellsModList | CellsMod LIST |

CellsMod

| PARAMETER | DESCRIPTION |
|---|---|
| cellID | ID OF CELL OF MEASUREMENT TARGET |
| MR margin | MR margin of TARGET CELL |
| ... | |

ReportConfigMod

| PARAMETER | DESCRIPTION |
|---|---|
| reportConfigID | REPORT SETTING ID |
| triggerQuantity | DESIGNATE WHETHER REPORT CONDITION IS RECEIVED POWER OR RECEPTION QUALITY. 0: RECEIVED POWER, 1: RECEPTION QUALITY |
| reportQuantity | DESIGNATE REPORT INFORMATION (WHETHER REPORT INFORMATION IS THE SAME AS THAT DESIGNATED BY triggerQuantity OR IS BOTH RECEIVED POWER AND RECEPTION QUALITY) 0: REPORT INFORMATION IS THE SAME AS THAT DESIGNATED BY triggerQuantity 1: REPORT INFORMATION IS BOTH RECEIVED POWER AND RECEPTION QUALITY |
| event | REPORT CONDITION |
| timeToTrigger | Time To Trigger |
| valueStepSize | MANAGEMENT UNIT WIDTH |

MeasIDMod

| PARAMETER | DESCRIPTION |
|---|---|
| measID | MEASUREMENT ID |
| measObjectID | ID OF MEASUREMENT TARGET |
| reportConfigID | REPORT SETTING ID |

FIG. 13

| MeasResults | | |
|---|---|---|
| | PARAMETER | DESCRIPTION |
| | measID | ID OF MEASUREMENT TARGET |
| | measResultServCell | INFORMATION OF SERVING CELL |
| | measResultNeighCells | measResultNeighCell LIST |
| measResultServCell | | |
| | PARAMETER | DESCRIPTION |
| | rsrpResult | RECEIVED POWER OF SERVING CELL |
| | rsrqResult | RECEPTION QUALITY OF SERVING CELL |
| measResultNeighCell | | |
| | PARAMETER | DESCRIPTION |
| | phyCellId | ID OF ADJACENT CELL |
| | rsrpResult | RECEIVED POWER OF ADJACENT CELL |
| | rsrqResult | RECEPTION QUALITY OF ADJACENT CELL |
| | valueStepLoc | MANAGEMENT UNIT POSITION OF MR |

FIG. 19

MEASUREMENT RESULT

| | | | | | | |
|---|---|---|---|---|---|---|
| 3 dB | | | | | | |
| 2 dB | | | | | | × |
| 0 dB | | | × | | × | × |
| −3 dB | × | × | | × | | |

MANAGEMENT RESULT

| | −3dB(+) | −3dB(+) | −3dB(+) | −3dB(+) | TRANSMIT MR | | | TRANSMIT MR | |
|---|---|---|---|---|---|---|---|---|---|
| MANAGEMENT 1 | | 0dB(+) | 0dB(+) | 0dB(+) | 0dB(+) | 0dB(+) | 0dB(+) | | |
| MANAGEMENT 2 | | | 2dB(+) | 0dB(+) | 0dB(+) | 0dB(+) | 0dB(+) | DISCARD | |
| MANAGEMENT 3 | | | | | 0dB(−) | 0dB(−) | 2dB(−) | 2dB(−) | |
| MANAGEMENT 4 | | | | | | | 2dB(+) | 2dB(+) | DISCARD |
| MANAGEMENT 5 | | | | | | | | | 2dB(+) |

⟵ TTT (FOR EXAMPLE, 640 ms) ⟶

WIRELESS COMMUNICATION SYSTEM, WIRELESS BASE STATION, WIRELESS TERMINAL, AND COMMUNICATION CONTROL METHOD

CROSS-REFERENCE TO RELATED APPLICATION

This application is a continuation application of International Application PCT/JP2011/071445, filed on Sep. 21, 2011 and designated the U.S., the entire contents of which are incorporated herein by reference.

FIELD

The present invention relates to a wireless communication system, a wireless base station, a wireless terminal, and a communication control method.

BACKGROUND

In recent years, a Long Term Evolution (LTE) service which is standardized in the 3rd generation partnership project (3GPP) has been provided.

As illustrated in FIG. 1, a wireless communication system based on the LTE system includes, for example, a plurality of wireless base stations 200-1 and 200-2 and at least one wireless terminal 400.

In a wireless communication system 100, when the wireless terminal 400 moves from a wireless area 300-1 to a wireless area 300-2, a handover is performed. In addition, the concept of the wireless areas 300-1 and 300-2 includes, for example, cells or sectors provided by the wireless base stations 200-1 and 200-2. Hereinafter, in some cases, for convenience of explanation, the wireless area is simply referred to as a cell.

The wireless terminal 400 measures the received power or the reception quality of radio signals transmitted from the wireless base station 200-1 which provides the cell 300-1 and the received power or the reception quality of radio signals transmitted from the wireless base station 200-2 which provides the cell 300-2. Then, the wireless terminal 400 transmits a report (MR: measurement report) including the measurement result to the wireless base station 200-1 which is a handover source.

When receiving the MR, the wireless base station 200-1 may start a handover process. For example, when receiving the MR from the wireless terminal 400, the wireless base station 200-1 starts the sequence of the handover process and determine a cell, which is a handover destination, on the basis of various kinds of information included in the received MR.

In the example illustrated in FIG. 1, a handover from the cell 300-1 as a serving cell to the cell (adjacent cell) 300-2 adjacent to the cell 300-1 is determined. That is, in the example illustrated in FIG. 1, the adjacent cell 300-2 is determined as a handover target cell.

After the handover destination is determined, the wireless base station 200-1, which is a handover source, transmits, to the wireless terminal 400, a handover instruction message including various kinds of information about the target cell 300-2 or the wireless base station 200-2 which is a handover destination.

The wireless terminal 400 which receives the message from the wireless base station 200-1 is handed over from the serving cell 300-1 to the target cell 300-2 and is connected to the wireless base station 200-2.

On the other hand, at least one of the conditions that the wireless terminal 400 measures the received power or the reception quality and the conditions that the wireless terminal 400 transmits the MR to the wireless base station 200-1 are set (transmitted) from the wireless base station 200-1 to the wireless terminal 400 in advance.

For example, the wireless terminal 400 regularly or irregularly measures the received power or the reception quality of the cell 300-1 and the received power or the reception quality of the adjacent cell 300-2. When the transmission conditions of the MR which are transmitted from the wireless base station 200-1 in advance are satisfied on the basis of the measurement result, the wireless terminal 400 transmits the MR to the wireless base station 200-1 which provides the serving cell 300-1. In addition, for example, the MR may include other information items related to the adjacent cell 300-2 in which the transmission conditions of the MR are satisfied.

Here, Event A3 which is one of the transmission conditions of the MR in the LTE system is represented by Expression (1).

[Expression 1]

$$Mn > Ms + MR\text{margin} \qquad (1)$$

In Expression (1), Mn is the received power [dBm] or the reception quality [dB] of an adjacent cell and Ms is the received power [dBm] or the reception quality [dB] of a serving cell. In addition, MRmargin is a margin value [dB] between Mn and Ms.

When the measurement results of Ms and Mn satisfy the transmission conditions [see Expression (1)] of the MRfor, for example, the time defined by TTT (Time To Trigger), the wireless terminal 400 transmits the MR to the wireless base station 200-1 to which the wireless terminal 400 is being connected and by which the handover process for the wireless terminal 400 is executed. In addition, TTT is a parameter indicating the stability of the received power or the reception quality with respect to time.

In 3GPP, for LTE, Self-Organizing Networks (SON) have been examined which automatically set various wireless parameters to perform optimization, thereby improving the efficiency of the management operation of the operator (administrator) (see 3GPP TR36.902 v9.2.0).

Among the SON use cases, Mobility Load Balancing (MLB) is considered which adjusts the parameters included in the transmission conditions of the MR between adjacent cells to balance a load, such as CPU utilization or wireless resource utilization, in each wireless base station.

In the wireless communication system using MLB, for example, when the load of the wireless base station 200-1 is equal to or greater than a certain threshold value, the transmission conditions of the MR may be changed (updated) such that the value of MRmargin in Expression (1) is reduced.

In this case, as illustrated in FIG. 2, the position of the wireless terminal 400 at the time when the MR is transmitted after MRmargin is reduced is closer to the wireless base station 200-1 than the position of the wireless terminal 400 at the time when the MR is transmitted before MRmargin is reduced.

In the example illustrated in FIG. 2, when receiving the MR from the wireless terminal 400, the wireless base station 200-1 may start the handover process using the adjacent cell 300-2 as a target cell.

That is, when the value of MRmargin is reduced, the start position of the handover for the wireless terminal 400 from the cell 300-1 to the cell 300-2 may shift closer to the wireless base station 200-1 than the start position of the handover of the wireless terminal 400 from the cell 300-1 to the cell 300-2 before MRmargin is reduced.

Therefore, it is easy to handover the wireless terminal 400 from the cell 300-1 provided by the wireless base station 200-1 to the cell 300-2 provided by the wireless base station 200-2. As a result, it is possible to reduce the load of the wireless base station 200-1.

Meanwhile, for example, when the load of the wireless base station 200-2 is equal to or greater than a certain threshold value, the transmission conditions of the MR may be changed (updated) such that the value of MRmargin included in the MR increases.

In this case, as illustrated in FIG. 3, the position of the wireless terminal 400 at the time when the MR is transmitted after MRmargin increases is closer to the wireless base station 200-2 than the position of the wireless terminal 400 at the time when the MR is transmitted before MRmargin increases.

Therefore, it is hard to handover the wireless terminal 400 from the cell 300-1 provided by the wireless base station 200-1 to the cell 300-2 provided by the wireless base station 200-2. As a result, it is possible to reduce the load of the wireless base station 200-2.

Japanese Laid-open Patent Publication No. 2009-147920 discloses a method in which a mobile station transmits a measurement report (MR) on the basis of a measurement rule indicating whether to transmit the MR which is transmitted from a wireless base station.

When the wireless terminal 400 transmits the MR, it consumes resources, such as transmission power or a wireless communication bandwidth. Therefore, as the transmission frequency of the MR increases, the consumption of the resources increases.

SUMMARY (1) According to a first aspect, a wireless communication system includes a wireless terminal and a wireless base station that wirelessly communicates with the wireless terminal. The wireless base station includes a first processor that manages a class of an indicator which is used to determine a handover for the wireless terminal and a first transmitter that transmits information about the classes to the wireless terminal. The wireless terminal includes a receiver that receives the information about the classes from the first transmitter, a second processor that determines whether the class of the indicator is changed to a different class on the basis of the received information about the classes, and a second transmitter that transmits information about the indicator to the wireless base station when it is determined that the class of the indicator is changed to the different class and does not transmit the information about the indicator to the wireless base station when it is determined that the class of the indicator is not changed.

(2) According to a second aspect, a wireless base station includes a processor that manages a class of an indicator which is used to determine a handover for a wireless terminal and a transmitter that transmits information about the classes to the wireless terminal.

(3) According to a third aspect, there is provided a wireless terminal that wirelessly communicates with a wireless base station which manages a class of an indicator used to determine a handover for the wireless terminal. The wireless terminal includes a receiver that receives information about the classes from the wireless base station, a processor that determines whether the class of the indicator is changed to a different class on the basis of the received information about the classes, and a transmitter that transmits information about the indicator to the wireless base station when it is determined that the class of the indicator is changed to the different class and does not transmit the information about the indicator to the wireless base station when it is determined that the class of the indicator is not changed.

(4) According to a fourth aspect, there is provided a method for controlling wireless communication of a wireless base station with a wireless terminal. The method includes managing a class of an indicator which is used to determine a handover for the wireless terminal and transmitting information about the classes to the wireless terminal.

(5) According to a fifth aspect, there is provided a method for controlling wireless communication of a wireless terminal with a wireless base station which manages a class of an indicator used to determine a handover for the wireless terminal. The method includes: receiving information about the classes from the wireless base station; and transmitting information about the indicator to the wireless base station when it is determined that the class of the indicator is changed to a different class on the basis of the received information about the classes and not transmitting the information about the indicator to the wireless base station when it is determined that the class of the indicator is not changed on the basis of the received information about the classes.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of a management table;

FIG. 8 is a diagram illustrating another example of the management table;

FIG. 9 is a diagram illustrating an example of the transmission of an RRC connection reconfiguration message;

FIG. 10 is a diagram illustrating an example of the content of a measurement report configuration message;

FIG. 13 is a diagram illustrating an example of the content of a measurement report;

FIG. 19 is a diagram illustrating an example of the measurement management table of the wireless terminal;

DESCRIPTION OF EMBODIMENTS

Hereinafter, an embodiment of the invention will be described with reference to the accompanying drawings. However, the following embodiment is an illustrative example and the invention includes various modifications and technical applications other than the following embodiment. That is, the embodiment can be varied in various ways without departing from the scope and spirit of the invention.

Figure 1:
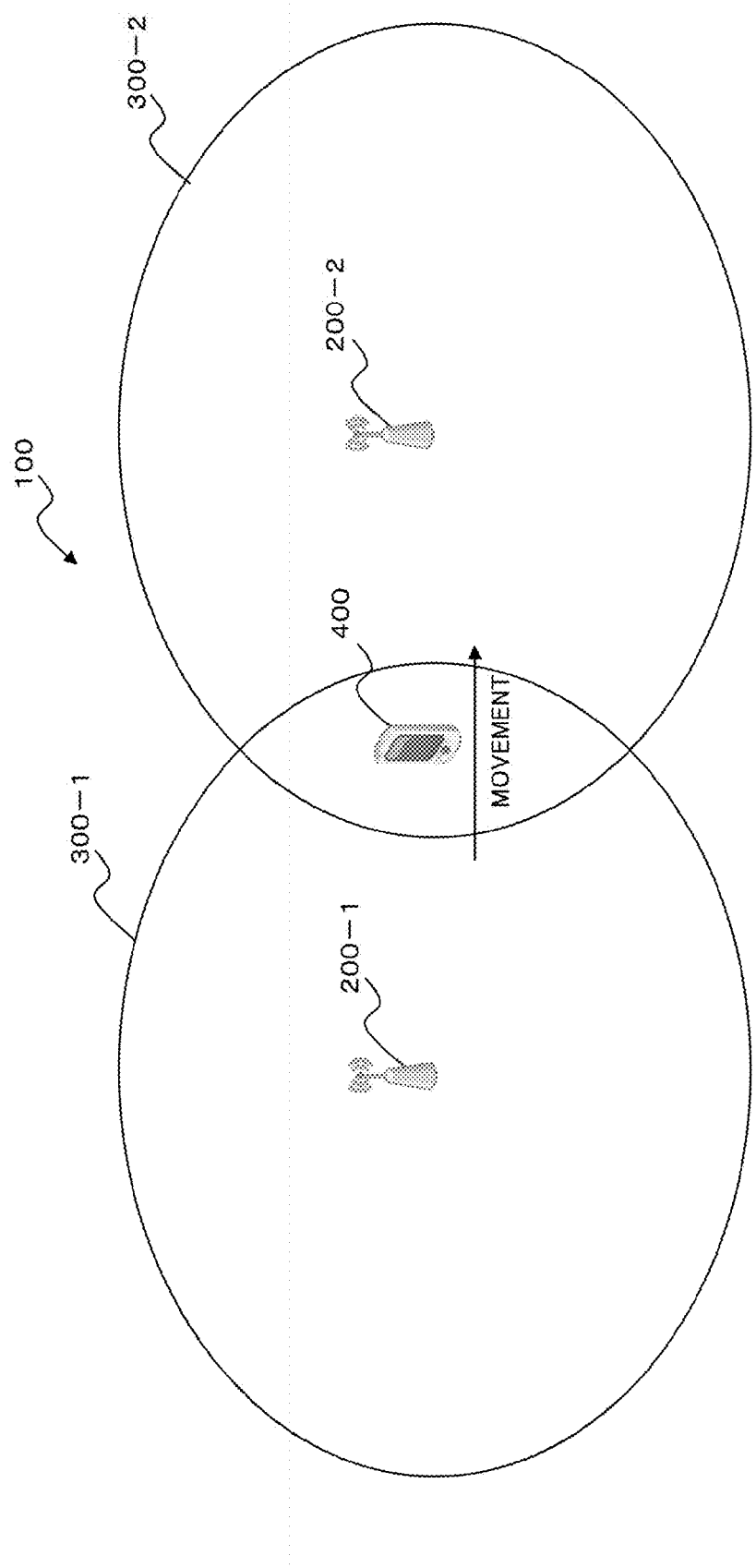
FIG. 1 is a diagram illustrating an example of a wireless communication system.
Figure 2:
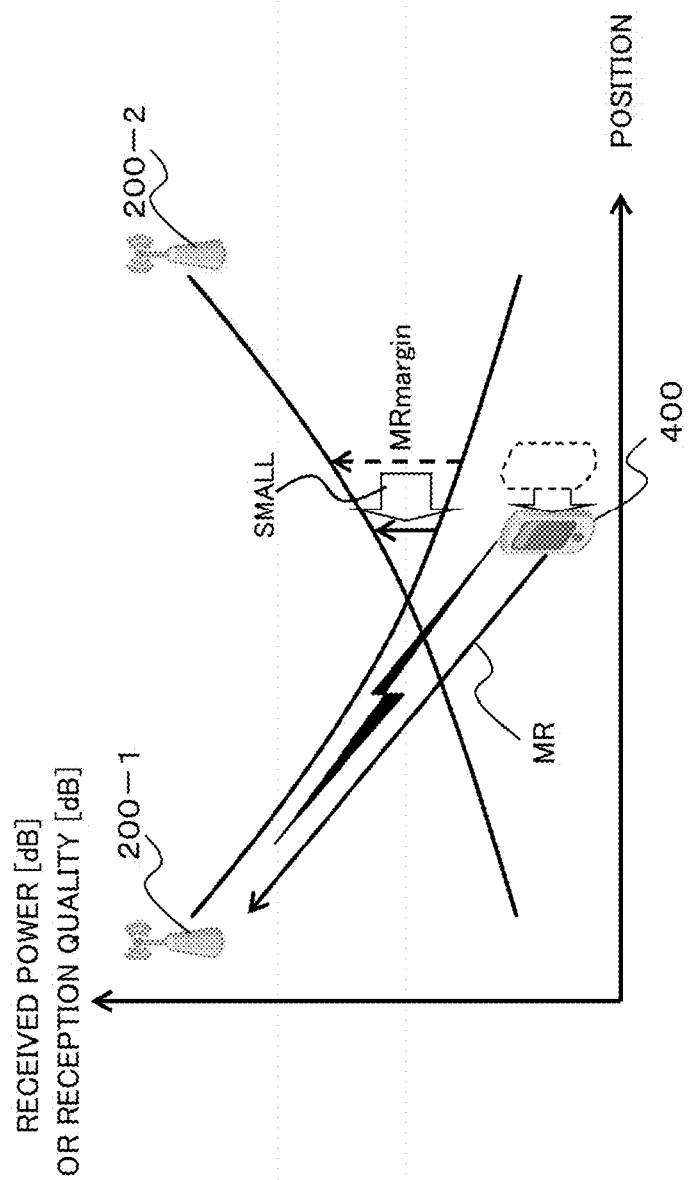
FIG. 2 is a diagram illustrating an example of the transmission of an MR before and after MRmargin is reduced.
Figure 3:
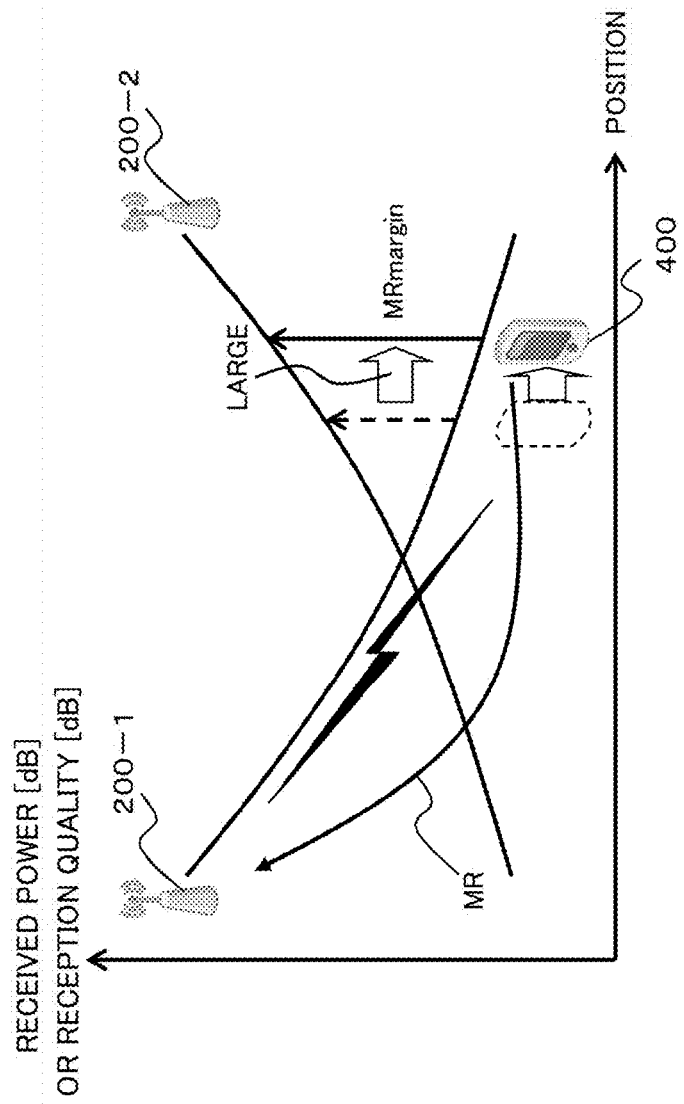
FIG. 3 is a diagram illustrating an example of the transmission of the MR before and after MRmargin increases.
Figure 4:
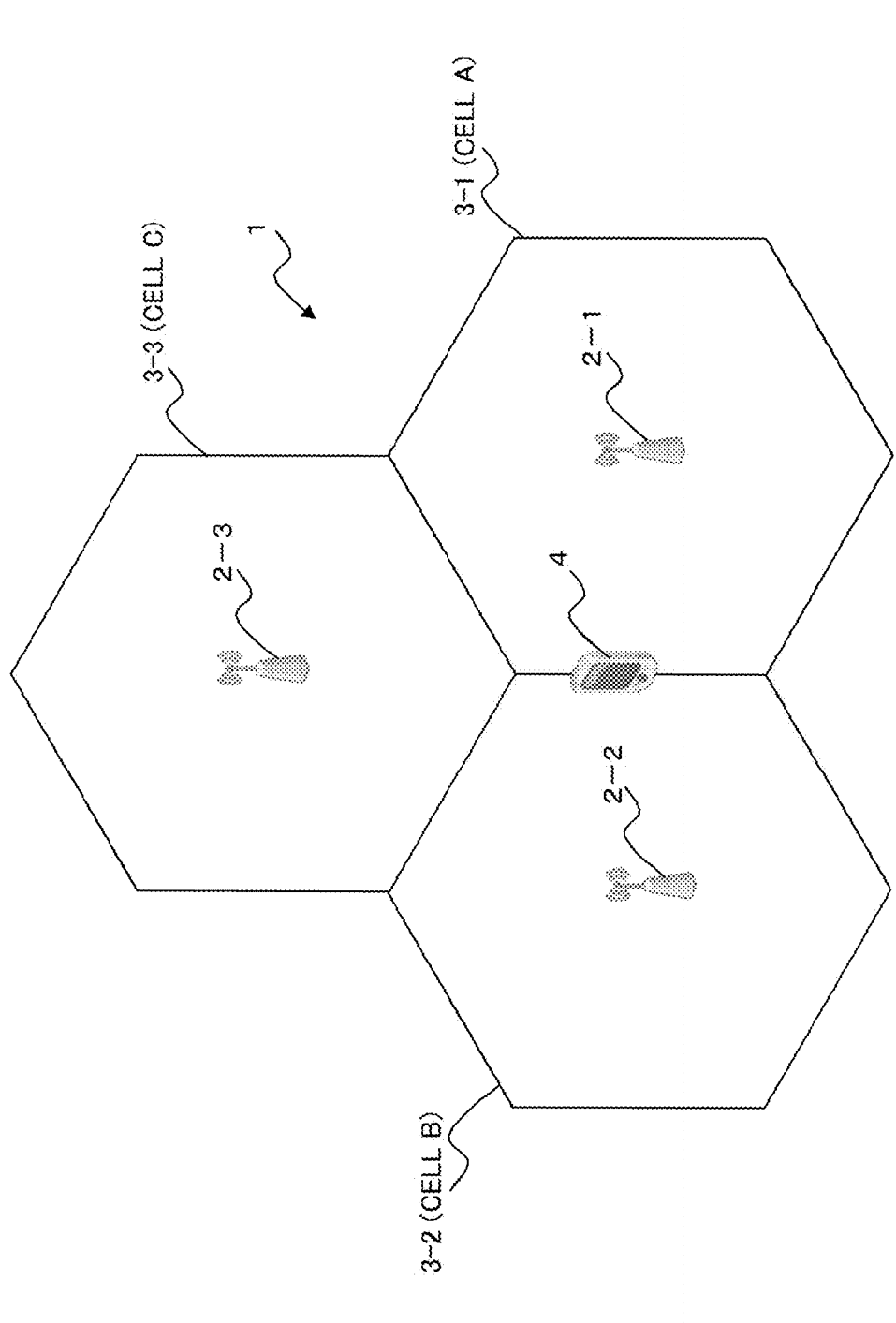
FIG. 4 is a diagram illustrating an example of a wireless communication system according to an embodiment of the invention.

[1] Description of Embodiment (1.1) Example of Structure of Wireless Communication System FIG. 4 is a diagram illustrating an example of the structure of a wireless communication system according to an embodiment. A wireless communication system 1 illustrated in FIG. 4 includes, for example, a plurality of wireless base stations 2-1, 2-2, and 2-3 and at least one wireless terminal 4. Hereinafter, when the wireless base stations 2-1, 2-2, and 2-3 are not distinguished, they are simply referred to as a wireless base station 2. The number of wireless base stations 2-1, 2-2, and 2-3 and the number of wireless terminals 4 are not limited to the values illustrated in FIG. 4.

In the example illustrated in FIG. 4, the wireless base stations 2-1, 2-2, and 2-3 provide a first wireless area 3-1, a second wireless area 3-2, and a third wireless area 3-3 which are adjacent to each other, respectively. The concept of each of the wireless areas 3-1, 3-2, and 3-3 includes, for example, a cell or a sector. However, for convenience of explanation, hereinafter, each wireless area is simply referred to as a cell in some cases. In the following description, in some cases, the wireless areas 3-1, 3-2, and 3-3 are referred to as a cell A, a cell B, and a cell C, respectively. In the example illustrated in FIG. 4, the wireless base stations 2-1, 2-2, and 2-3 form the cell A, the cell B, and the cell C, respectively. However, for example, at least one wireless base station 2 may form a plurality of cells. In the cells A to C, the same wireless frequency or different wireless frequencies may be used. The arrangement of the wireless base stations 2 and the arrangement of the cells are illustrative examples, but are not limited to the example illustrated in FIG. 4.

The wireless base station 2 has a function of wirelessly communicating with the wireless terminal 4 which is disposed in the cell formed by the wireless base station 2.

The wireless terminal 4 may move in the cells A to C. For example, when the wireless terminal 4 is disposed in the cell A, it may mainly perform wireless communication with the wireless base station 2-1 which provides the cell A as a serving cell.

In addition, the wireless terminal 4 regularly or irregularly measures the received power or the reception quality (Ms) of radio signals transmitted from the wireless base station 2 which provides the serving cell and the received power or the reception quality (Mn) of radio signals transmitted from the wireless base station 2 which provides an adjacent cell. The wireless terminal 4 may transmit a measurement report (MR) including Ms and Mn to the wireless base station 2 which is a handover source.

(1.2) For Conditions for Starting Handover

In this embodiment, the wireless base station 2 may start the handover for the wireless terminal 4 on the basis of receiving the MR from the wireless terminal 4, or it may start the handover on the basis of handover conditions which are set separately from the transmission conditions of the MR.

For example, before handing over the wireless terminal 4, the wireless base station 2 determines whether the handover conditions are satisfied on the basis of information included in the MR which is received from the wireless terminal 4. When it is determined that the handover conditions are satisfied, the wireless base station 2 hands over the wireless terminal 4. On the other hand, when it is determined that the handover conditions are not satisfied, the wireless terminal 4 may postpone the handover.

The handover conditions are represented by, for example, the following Expression (2).

[Expression 2]

$$Mn > Ms + HOmargin \quad (2)$$

In Conditional Expression (2), Mn is the received power [dBm] or the reception quality [dB] of an adjacent cell and Ms is the received power [dBm] or the reception quality [dB] of a serving cell. In addition, HOmargin is a margin value [dB] between Mn and Ms.

Before the handover conditions [Expression (2)] are satisfied, the transmission conditions [Expression (1)] of the MR are satisfied. Therefore, the following relational Expression (3) is established between MRmargin and HOmargin.

[Expression 3]

$$MRmargin < HOmargin \quad (3)$$

However, since the MR includes the received power or the reception quality (Ms) of the serving cell and the received power or the reception quality (Mn) of the adjacent cell, the wireless base station 2 can predict whether the wireless terminal 4, which is the transmission source of the MR, is handed over to the adjacent cell when HOmargin is changed in the handover conditions [Expression (2)].

FIG. 5 illustrates an example of a management table for managing the handover of the wireless terminal 4. FIG. 5 illustrates an example of the management table managed by the wireless base station 2-1 which provides the cell A as the serving cell. However, the other wireless base stations 2-2 and 2-3 may hold the same management table.

As illustrated in FIG. 5, the wireless base station 2 manages the wireless terminal 4 as a unit of control in the handover conditions. Here, the unit of control in the handover conditions means a minimum unit in which HOmargin may be changed by MLB. In the example illustrated in FIG. 5, the unit of control in the handover conditions is 1 [dB]. However, the value is an illustrative example and the unit of control in the handover conditions is not limited thereto.

For example, the wireless base station 2 calculates an indicator (Mn−Ms) which is used to determine a handover from Ms and Mn included in the MR and manages the handover for the wireless terminal 4 on the basis of the calculated indicator (Mn−Ms).

In the example illustrated in FIG. 5, a wireless terminal 4 (UE_A) whose difference (MnB−Ms) between the received power or the reception quality (MnB) of the adjacent cell B and the received power or the reception quality (Ms) of the serving cell A is equal to or more than −2 [dB] and less than −1 [dB] is managed in a data section (hereinafter, simply referred to as a class) of '−2 [dB]'.

A wireless terminal 4 (UE_E) whose difference (MnC−Ms) between the received power or the reception quality (MnC) of the adjacent cell C and the received power or the reception quality (Ms) of the serving cell A is equal to or more than −2 [dB] and less than −1 [dB] is managed in a class of '−2 [dB]'.

Similarly, a wireless terminal 4 (UE_B, UE_C) whose value of (MnB−Ms) is equal to or more than −1 [dB] and less than 0 [dB] is managed in a class of '−1 [dB]'. A wireless terminal 4 (UE_F) whose value of (MnC−Ms) is equal to or more than 0 [dB] and less than 1 [dB] is managed in a class of '0 [dB]'. A wireless terminal 4 (UE_D, UE_G, UE_H) whose value of (MnB−Ms) or (MnC−Ms) is equal to or more than 1 [dB] and less than 2 [dB] is managed in a class of '1 [dB]'.

The content of the management table is appropriately updated according to the content of the MR transmitted from the wireless terminal 4.

In the example illustrated in FIG. 5, the value of HOmargin under the handover conditions to the adjacent cell B or the adjacent cell C is 2 [dB] and the wireless base station 2 determines that the wireless terminal 4 whose value of (Mn−Ms) is greater than 2 [dB] is handed over to the adjacent cell B or the adjacent cell C.

When the wireless base station 2 disperses a load by the handover of the wireless terminal 4 from the serving cell to an adjacent cell using MLB, it can predict the handover on the basis of a change of the value of HOmargin with reference to the management table illustrated in FIG. 5.

For example, when HOmargin is changed from 2 [dB] to 1 [dB] for the adjacent cell C, UE_G and UE_H satisfy the handover conditions to the adjacent cell C. Therefore, the wireless base station 2 changes HOmargin predicting that UE_G and UE_H will be handed over to the adjacent cell C. The wireless base station 2 appropriately sets the value of HOmargin on the basis of the prediction result to perform load balancing with another adjacent wireless base station 2.

However, for the value of (Mn−Ms), when (Mn−Ms) is not changed from a previous class to a different class, the wireless terminal 4 regularly or irregularly transmits the MR as long as the transmission conditions of the MR are satisfied, even though the content of the management table is not updated. Therefore, in some cases, the consumption of resources increases due to the unnecessary transmission of the MR.

When the MR is transmitted first, the conditions of TTT with respect to the transmission conditions of the MR are considered. However, in the subsequent transmission of the MR, the conditions of TTT are ignored in some cases. Therefore, the wireless base station 2 updates the content of the management table on the basis of information about the instantaneous received power or the reception quality of the MR which is continuously transmitted from the wireless terminal 4. Therefore, in some cases, it is difficult to stably control a handover on the basis of the management table.

In this example, the wireless base station 2 manages classes including the indicator (Mn−Ms) which is used to determine the handover for the wireless terminal 4 and transmits information about classes to the wireless terminal 4.

In addition, in this example, when it is determined that the class of the wireless terminal 4 is changed to a different class on the basis of the information about the classes received from the wireless base station 2, it transmits (sends) the MR to the wireless base station 2. On the other hand, when it is determined that the class of the wireless terminal is not changed to the different class, it does not transmit the MR to the wireless base station 2.

Therefore, it is possible to suppress the transmission of the MR and reduce the consumption of resources.

(1.3) Example of Structure of Wireless Base Station 2

Figure 6:
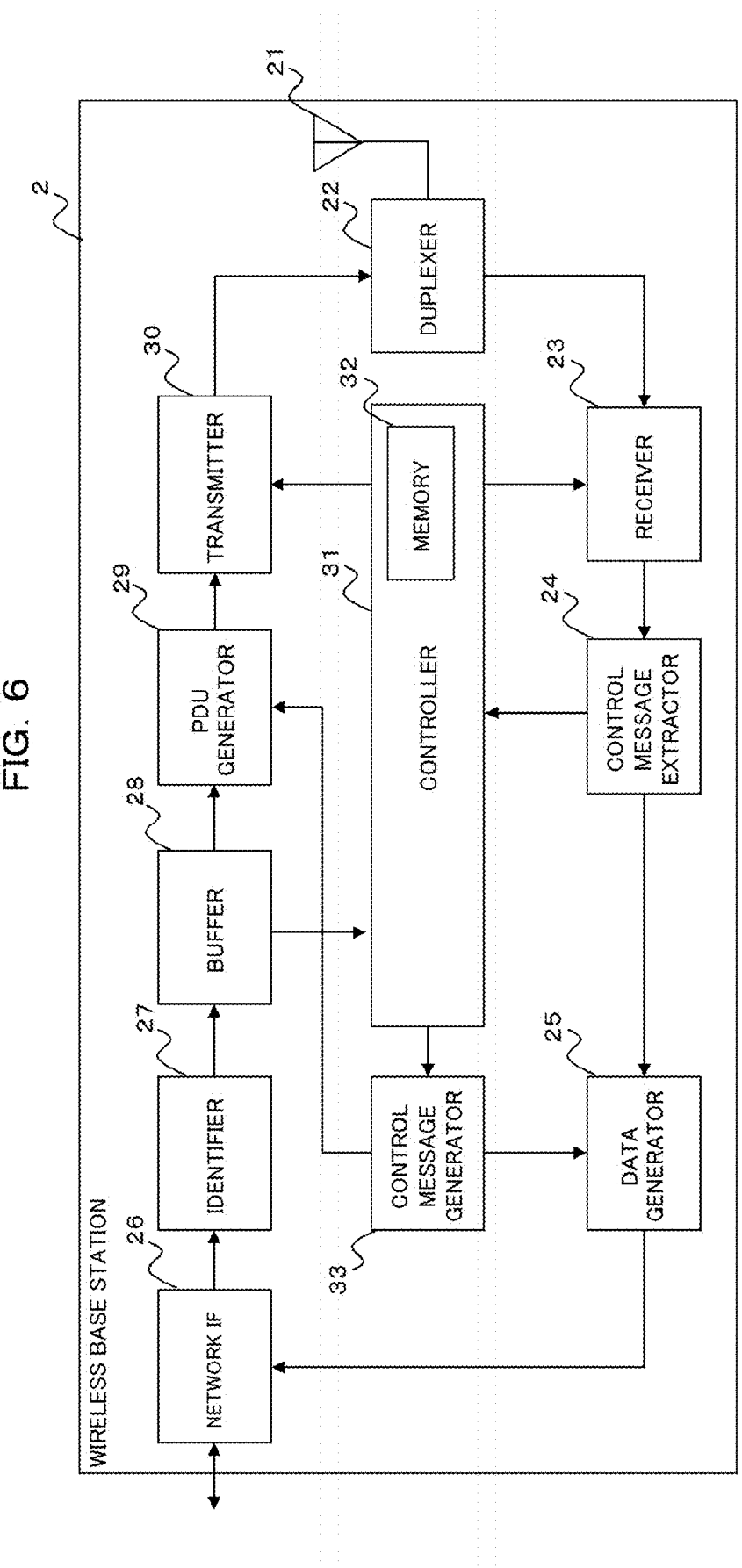
FIG. 6 is a diagram illustrating an example of the structure of a wireless base station illustrated in FIG. 4.

FIG. 6 is a diagram illustrating an example of the structure of the wireless base station 2. Next, this embodiment will be described using the structure of the wireless base station 2-1 as an example. The other wireless base stations 2-2 and 2-3 may have the same structure as the wireless base station 2-1.

For example, the wireless base station 2 illustrated in FIG. 6 includes an antenna 21, a duplexer 22, a receiver 23, a control message extractor 24, a data generator 25, a network interface (IF) 26, an identifier 27, and a buffer 28. In addition, the wireless base station 2 further includes a protocol data unit (PDU) generator 29, a transmitter 30, a controller 31, a memory 32, and a control message generator 33.

The antenna 21 functions as a reception antenna which receives radio signals from the wireless terminal 4 and functions as a transmission antenna which transmits radio signals to the wireless terminal 4. That is, in this example, the antenna 21 is configured such that the reception antenna and the transmission antenna are shared by the duplexer 22. FIG. 6 illustrates an example of the structure of the wireless base station 2. For example, when the duplexer 22 is not used, the wireless base station 2 may separately include the transmission antenna and the reception antenna.

The receiver 23 performs a certain reception process for the radio signals which are received by the antenna 21 from the wireless terminal 4. The reception process includes, for example, a down-conversion process, an analog/digital conversion process, a demodulation process, and a decoding process. The signal subjected to the reception process of the receiver 23 is output to the control message extractor 24.

The control message extractor 24 extracts a control message addressed to the host wireless base station 2 and data addressed to a wired network which are included in the signal received from the wireless terminal 4.

Therefore, the control message extractor 24 can determine whether data included in the signal received from the wireless terminal 4 is the control message addressed to the host wireless base station 2 or data addressed to the wired network which is positioned upward of the wireless base station 2. For example, when the data received from the wireless terminal 4 has a packet format including a header and a payload, the control message extractor 24 can determine whether the packet is the control message addressed to the host wireless base station 2 or data addressed to the wired network on the basis of, for example, various kinds of identification information stored in a header portion of the packet.

When it is determined that the data included in the signal received from the wireless terminal 4 is the control message addressed to the host wireless base station 2, the control message extractor 24 outputs the control message to the controller 31. On the other hand, when it is determined that the data included in the signal received from the wireless terminal 4 is the data addressed to the wired network, the control message extractor 24 outputs the data to the data generator 25.

The control message addressed to the host wireless base station 2 includes the MR from the wireless terminal 4. That is, the control message extractor 24 can extract, for example, the received power or the reception quality (Ms) of the cell A, the received power or the reception quality (MnB) of the cell B, and the received power or the reception quality (MnC) of the cell C from the MR.

The control message generator 33 generates a control message addressed to the wireless terminal 4 or control messages addressed to the other wireless base stations 2-2 and 2-3 adjacent to the wireless base station 2.

The generated control message addressed to the wireless terminal 4 is output from the control message generator 33 to the PDU generator 29. The control message addressed to the wireless terminal 4 includes, for example, an RRC connection reconfiguration message, which will be described below.

The generated control messages addressed to the wireless base stations 2-2 and 2-3 are output from the control message generator 33 to the data generator 25. In addition, the control messages addressed to the wireless base stations 2-2 and 2-3 include control information about a handover, such as a handover request message, a handover request acknowledge message, a mobility change request message, and a mobility change acknowledge message.

The data generator 25 converts each control message input from the control message extractor 24 and the control message generator 33 into data with a format corresponding to the format of the wired network. The data converted by the data generator 25 is output to the network IF 26.

The network IF 26 functions as an interface between the wireless base station 2 and the wired network. For example, the network IF 26 receives data addressed to the wireless terminal 4 from the wired network or transmits data received from the wireless terminal 4 to the wired network.

In addition, the network IF 26 can transmit and receive data to and from the other wireless base stations 2-2 and 2-3 adjacent to the wireless base station 2. Therefore, the wireless base station 2 can transmit various control messages to the adjacent wireless base stations 2-2 and 2-3 or receive various control messages from the adjacent wireless base stations 2-2 and 2-3. The control messages transmitted and received between the wireless base station 2 and the adjacent wireless base stations 2-2 and 2-3 include, for example, a mobility change request message and a mobility change acknowledge message.

The identifier 27 identifies whether the data which is received from the wired network through the network IF 26 is data addressed to the host wireless base station 2 or data addressed to the wireless terminal 4 on the basis of the content of the received data.

For example, when the data received from the wired network has a packet format including a header and a payload, the identifier 27 can identify whether the packet is data addressed to the host wireless base station 2 or data addressed to the wireless terminal 4 on the basis of various kinds of identification information stored in a header portion of the packet.

The identifier 27 stores the data received from the wired network in each buffer area which is provided for each address in the buffer 28 on the basis of the identification result. In addition, the buffer areas may be different memories of the buffer 28 or a plurality of memory areas which are provided in a single memory of the buffer 28.

The buffer 28 stores data from the identifier 27. As described above, the buffer 28 can store data input from the identifier 27 in different buffers according to the address (type) of the input data.

In this case, for example, the buffer 28 can include buffers corresponding to the number of wireless terminals 4 connected to the host wireless base station 2 and include a buffer for storing data for the host wireless base station 2. In addition, the number of buffers which store the data addressed to the wireless terminals 4 may correspond to the number of data types, such as VoIP and Web.

The buffer for storing the data addressed to the host wireless base station 2 stores control messages, such as a mobility change request message which is received from other wireless base stations 2-2 and 2-3 adjacent to the host wireless base station 2 and a mobility change acknowledge message. The control messages are output to the controller 31.

The PDU generator 29 converts the data addressed to the wireless terminal 4 which is stored in the buffer 28 or the control message addressed to the wireless terminal 4 which is generated by the control message generator 33 into a data format required for data transmission from the wireless base station 2 to the wireless terminal 4 and generates a PDU.

The transmitter 30 performs a certain transmission process for the PDU generated by the PDU generator 29 and transmits the PDU to the wireless terminal 4 through the antenna 21. The transmission process includes, for example, an encoding process, a modulation process, a digital/analog conversion process, and an up-conversion process.

The controller 31 performs various types of control processes related to the operation of the wireless base station 2.

For example, the controller 31 controls scheduling for the transmission and reception of data between the host wireless base station 2 and the wireless terminal 4 on the basis of the buffer status of the buffer 28. The controller 31 controls the PDU generator 29, the transmitter 30, and the receiver 23 such that data is transmitted and received between the host wireless base station 2 and the wireless terminal 4 on the basis of the scheduling control result.

In addition, when controlling the wireless terminal 4 or other wireless base stations 2-2 and 2-3, the controller 31 can instruct the control message generator 33 to generate various control messages.

Furthermore, the controller 31 can store the handover conditions between the host wireless base station 2 and other wireless base stations 2-2 and 2-3 in the memory 32 on the basis of the control messages, such as the mobility change request message or the mobility change acknowledge message, received from other wireless base stations 2-2 and 2-3 through the network IF 26, the identifier 27, and the buffer 28.

The content of the handover conditions stored in the memory 32 may be appropriately updated on the basis of the mobility change request message received from other wireless base stations 2-2 and 2-3.

In this embodiment, the controller 31 manages the wireless terminal 4 on the basis of the information which is extracted by the control message extractor 24 and is included in the MR received from the wireless terminal 4.

For example, the controller 31 calculates the indicator (Mn−Ms) for the handover of the wireless terminal 4 from reception quality information Mn and Ms which is included in the MR transmitted from the wireless terminal 4 and manages the indicator using the management table stored in the memory 32. Then, the controller 31 controls the handover of the wireless terminal 4 on the basis of the content of the management table and the handover conditions from the serving cell to an adjacent cell. For example, the controller 31 determines the handover of the wireless terminal 4 when the value of the indicator (Mn−Ms) is greater than a certain threshold value (HOmargin).

That is, in this embodiment, the controller 31 functions as an example of a first processor that manages the class including the indicator (Mn−Ms) used to determine the handover of the wireless terminal 4.

The memory 32 is, for example, a storage unit and stores information about the wireless terminal 4 or information about the wireless communication system 1. As described above, the memory 32 stores the management table for managing the indicator (Mn−Ms) for a handover at the position of the wireless terminal 4. The content of the management table is updated by the controller 31 on the basis of the MR transmitted from the wireless terminal 4. For example, when the class of the indicator (Mn−Ms) is changed to a different class, the controller 31 updates the management table such that the class for managing the wireless terminal 4 is changed, on the basis of the MR transmitted from the wireless terminal 4.

An example of the management table has been described with reference to FIG. 5. However, another example of the management table illustrated in FIG. 8 may be used. The management table illustrated in FIG. 8 differs from the management table illustrated in FIG. 5 in which the classes have the same class width in that classes have different class widths.

In the example illustrated in FIG. 8, a wireless terminal 4 (UE_A) in which the difference (MnB−Ms) between the received power or the reception quality (MnB) of an adjacent cell B and the received power or the reception quality (Ms) of a serving cell A is equal to or more than −3 [dB] and less than 0 [dB] is managed in a class of '−3 [dB]'.

A wireless terminal 4 (UE_E) in which the difference (MnC−Ms) between the received power or the reception quality (MnC) of an adjacent cell C and the received power or the reception quality (Ms) of the serving cell A is equal to or more than −3 [dB] and less than 0 [dB] is also managed in a class of '−3 [dB]'.

Similarly, a wireless terminal 4 (UE_B, UE_C) in which the value of (MnB−Ms) is equal to or more than 0 [dB] and less than 2 [dB] is managed in a class of '0 [dB]'. A wireless terminal 4 (UE_F) in which the value of (MnC−Ms) is equal to or more than 2 [dB] and less than 3 [dB] is managed in a class of '2 [dB]'. A wireless terminal 4 (UE_D, UE_G, UE_H) in which the value of (MnB−Ms) or (MnC−Ms) is equal to or more than 3 [dB] and less than 4 [dB] is managed in a class of '3 [dB]'.

In the example illustrated in FIG. 8, the value of HOmargin under the handover conditions to the adjacent cell B or the adjacent cell C is 4 [dB] and the wireless terminal 4 in which the value of (Mn−Ms) is greater than 4 [dB] is handed over to the adjacent cell B or the adjacent cell C by the wireless base station 2.

In the example illustrated in FIG. 8, a unit of control in the handover conditions is not constant unlike the example illustrated in FIG. 5. That is, in the example illustrated in FIG. 5, the unit of control in the handover conditions is 1 [dB] and is constant. However, in the example illustrated in FIG. 8, the unit of control in the handover conditions is changed to 3 [dB], 2 [dB], and 1 [dB] from the left side of FIG. 8. In this case, the controller 31 may change HOmargin in the unit of control based on each class width in the management table. For example, in the example illustrated in FIG. 8, the controller 31 may change HOmargin in different units of control, such as 1 [dB], 2 [dB], and 3[dB].

The controller 31 may control the handover conditions on the basis of the load status of the host wireless base station 2 or the load status of the adjacent wireless base stations 2-2 and 2-3. For example, when the load status of the host wireless base station 2 is equal to or greater than a certain threshold value, the controller 31 can perform control such that the value of HOmargin in the handover conditions is reduced.

For example, in the example illustrated in FIG. 8, when HOmargin is changed from 4 [dB] to 3 [dB] for the adjacent cell C, UE_G and UE_H satisfy the handover conditions to the adjacent cell C and are handed over to the adjacent cell C. Therefore, it is possible to disperse the load of the host wireless base station 2 to the wireless base station 2-3.

For example, when the load status of the wireless base station 2-2 is equal to or greater than the certain threshold value, the controller 31 can perform control such that the value of HOmargin in the handover conditions is increased.

For example, in the example illustrated in FIG. 8, when HOmargin is changed to a value greater than 4 [dB] for the adjacent cell B, the wireless terminal 4 which has been handed over to the adjacent cell B can be connected to the host wireless base station 2 and the load of the wireless base station 2-2 can be dispersed (charged) to the host wireless base station 2.

In this example, the transmitter (first transmitter) 30 transmits information about the classes in the management table to the wireless terminal 4.

Therefore, the wireless terminal 4 determines whether to transmit the MR on the basis of whether the indicator (Mn−Ms) calculated from the Mn and Ms, measured in the host wireless terminal 4, is changed to a different class. As a result, it is possible to suppress the transmission of the MR and reduce the consumption of resources.

(1.4) Example of Structure of Wireless Terminal 4

Figure 7:
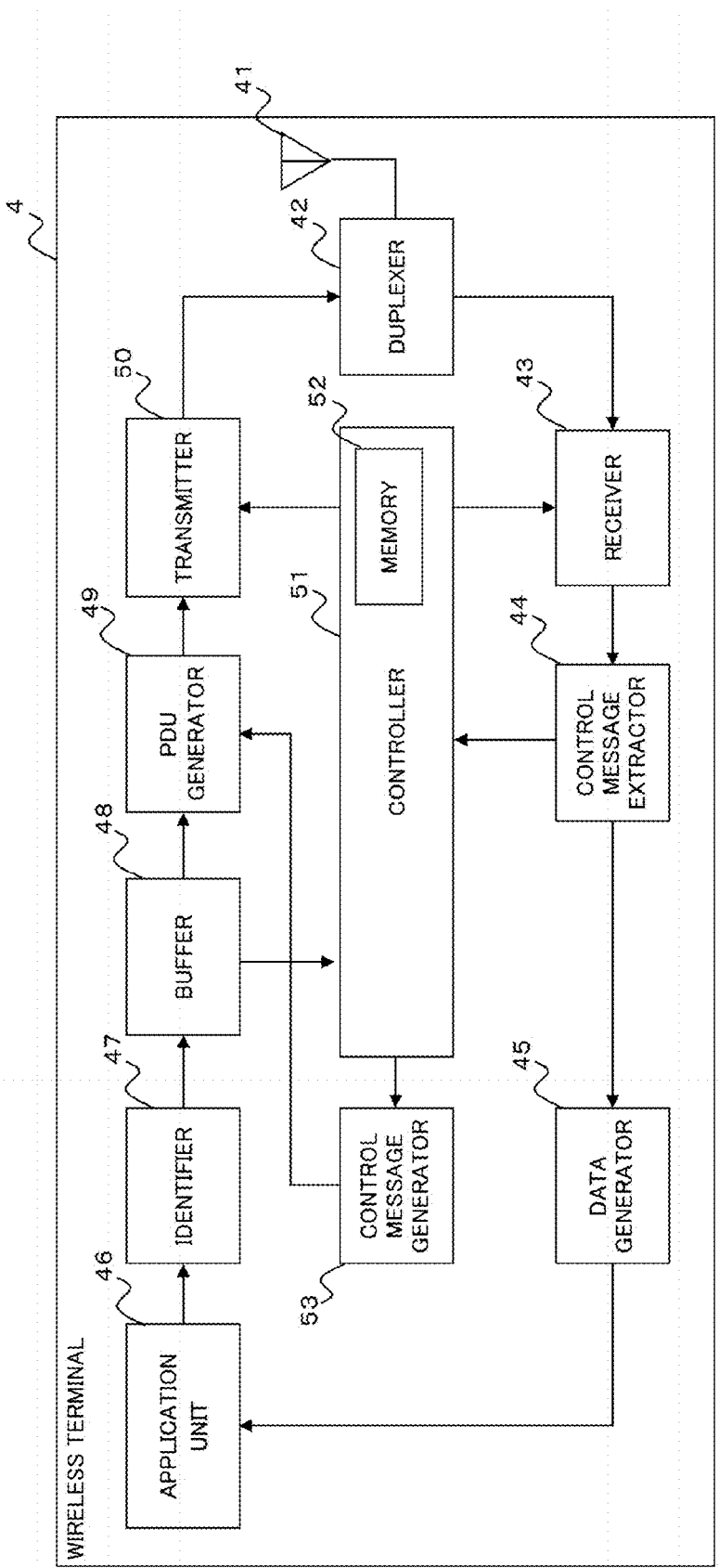
FIG. 7 is a diagram illustrating an example of the structure of a wireless terminal illustrated in FIG. 4.

FIG. 7 is a diagram illustrating an example of the structure of the wireless terminal 4.

The wireless terminal 4 illustrated in FIG. 7 includes, for example, an antenna 41, a duplexer 42, a receiver 43, a control message extractor 44, a data generator 45, an application unit 46, an identifier 47, and a buffer 48. In addition, the wireless terminal 4 includes, for example, a PDU generator 49, a transmitter 50, a controller 51, a memory 52, and a control message generator 53.

The antenna 41 functions as a reception antenna that receives radio signals from the wireless base station 2-1 which is connected to the wireless terminal 4 and forms the cell A as a serving cell and functions as a transmission antenna that transmits radio signals to the wireless base station 2-1. That is, in this example, the antenna 41 is configured such that the reception antenna and the transmission antenna are shared by the duplexer 42. FIG. 7 illustrates an example of the structure of the wireless terminal 4. For example, when the duplexer 42 is not used, the wireless terminal 4 may separately include the transmission antenna and the reception antenna.

The antenna 41 can receive radio signals from other wireless base stations 2-2 and 2-3 adjacent to the wireless base station 2-1 or transmit radio signals to other wireless base stations 2-2 and 2-3.

The receiver 43 performs a certain reception process for the radio signal received by the antenna 41. The reception process includes, for example, a down-conversion process, an analog/digital conversion process, a demodulation process, and a decoding process. The signal subjected to the reception process of the receiver 43 is output to the control message extractor 44.

The control message extractor 44 extracts a control message addressed to the host wireless terminal 4 and application data which are included in the signal received from the wireless base station 2.

Therefore, the control message extractor 44 can determine whether the data which is included in the signal received from the wireless base station 2 is a control message or application data. For example, when the data received from the wireless base station 2 has a packet format including a header and a payload, the control message extractor 44 can determine whether the packet is a control message or application data on the basis of, for example, various kinds of identification information stored in a header portion of the packet.

When it is determined that the data which is included in the signal received from the wireless base station 2 is a control message, the control message extractor 44 outputs the control message to the controller 51. On the other hand, when it is determined that the data which is included in the signal received from the wireless base station 2 is application data, the control message extractor 44 outputs the data to the data generator 45.

The control message includes an RRC connection reconfiguration message, which will be described below.

That is, in this embodiment, the receiver 43 functions as an example of a receiver which receives information about the class from the wireless base station 2.

The control message generator 53 generates a control message addressed to the wireless base station 2 or control messages addressed to other wireless base stations 2-2 and 2-3 adjacent to the wireless base station 2.

The generated control message is output from the control message generator 53 to the PDU generator 49. The control message addressed to the wireless base station 2 includes, for example, an MR.

The data generator 45 converts the application data input from the control message extractor 44 into data with a format corresponding to an application format. The data converted by the data generator 45 is output to the application unit 46.

The application unit 46 provides a certain application to the user of the wireless terminal 4 on the basis of the data converted by the data generator 45.

The identifier 47 identifies the content of the data received from the application unit 46.

The identifier 47 stores the data received from the application unit 46 in each buffer area which is provided for each address in the buffer 48 on the basis of the identification result. The buffer areas may be different memories of the buffer 48 or a plurality of storage areas which are provided in a single memory of the buffer 48.

The buffer 48 stores data from the identifier 47. As described above, the buffer 48 can store data input from the identifier 47 in different buffers according to the address (type) of the input data.

In this case, for example, the buffer 48 may include buffers corresponding to the number of addresses of data transmitted from the host wireless terminal 4 or buffers corresponding to the number of data types, such as VoIP and Web.

The PDU generator 49 converts the data addressed to the wireless base station 2 which is stored in the buffer 48 or the control message addressed to the wireless base station 2 which is generated by the control message generator 53 into a data format required for data transmission from the wireless terminal 4 to the wireless base station 2 and generates a PDU.

The transmitter 50 performs a certain transmission process for the PDU generated by the PDU generator 49 and transmits the PDU to the wireless base station 2 through the antenna 41. The transmission process includes, for example, an encoding process, a modulation process, a digital/analog conversion process, and an up-conversion process.

The controller 51 performs various types of control for the operation of the wireless terminal 4.

For example, the controller 51 requests the wireless base station 2 to allocate radio resources or controls scheduling for the transmission and reception of data between the host wireless terminal 4 and the wireless base station 2 on the basis of the buffer status of the buffer 48. The controller 51 controls the PDU generator 49, the transmitter 50, and the receiver 43 such that data is transmitted and received between the host wireless terminal 4 and the wireless base station 2 on the basis of the scheduling control result.

When control is performed for the wireless base station 2, the controller 51 can instruct the control message generator 53 to generate various control messages.

The controller 51 measures the received power or the reception quality (Ms) of the serving cell and the received power or the reception quality (Mn) of adjacent cells on the basis of an MR configuration message which is transmitted from the wireless base station 2 and is acquired by the control message extractor 44.

For example, the controller 51 measures and calculates the received power or the reception quality (Ms) of the wireless base station 2 on the basis of the signal received from the wireless base station 2. In addition, the controller 51 measures and calculates the received power or the reception quality (Mn) of adjacent wireless base stations 2-2 and 2-3 on the basis of the signals received from the adjacent wireless base stations 2-2 and 2-3.

For example, the controller 51 can measure the received power (RSRP: reference signal received power) of a known signal such as a pilot signal included in the signals received from the wireless base station 2, or the reception quality (RSRQ: reference signal received quality) of the known signal.

The measurement result is stored in the memory 52. The memory 52 is, for example, a storage unit and may store information about the wireless base station 2 or information about the wireless communication system 1 in addition to the measurement result.

The controller (second processor) 51 determines whether the class of the indicator (Mn−Ms) is changed to a different class from the measurement result on the basis of the information about the class transmitted from the wireless base station 2.

For example, when the class of the indicator (Mn−Ms) is consistently kept in a class, different from the class to which the indicator has been kept, for a certain period determined by TTT, the controller 51 can determine that the indicator (Mn−Ms) is changed to the different class. Therefore, even when there is a great change in a wireless propagation environment around the wireless terminal 4, it is possible to stabilize the accuracy of measurement.

For example, the controller 51 determines whether the class of the indicator (Mn−Ms) is changed to a different class using the measurement management table stored in the memory 52. An example of the determination method will be described below.

When it is determined that the class of the indicator (Mn−Ms) is changed to a different class as the measurement result, the controller 51 performs control to transmit the MR including information (Mn and Ms) about the indicator (Mn−Ms) to the wireless base station 2.

For example, when it is determined that the host wireless terminal 4 satisfies the transmission (notification) conditions of the MR, the controller 51 instructs the control message generator 53 to generate an MR.

The control message generator 53 generates an MR in response to an instruction from the controller 51. The MR generated by the control message generator 53 is output to the transmitter 50.

The transmitter 50 performs a certain transmission process for a signal including the MR output from the control message generator 53 and transmits the signal to the wireless base station 2 through the antenna 41. The transmission process includes, for example, an encoding process, a modulation process, a digital/analog conversion process, and an up-conversion process.

On the other hand, when it is determined that the indicator (Mn−Ms) is not changed to a different class, the controller 51 performs control such that the MR including the information (Mn and Ms) about the indicator (Mn−Ms) is not transmitted to the wireless base station 2.

That is, in this embodiment, the transmitter 50 functions as an example of a second transmitter which transmits the information (Mn and Ms) about the indicator (Mn−Ms) to the wireless base station 2 when the controller 51 determines that the class of the indicator (Mn−Ms) is changed to a different class, and does not transmit the information (Mn and Ms) about the indicator (Mn−Ms) to the wireless base station 2 when the controller 51 determines that the indicator (Mn−Ms) is not changed to a different class.

The wireless terminal 4 having the above-mentioned structure can control the transmission frequency of the MR on the basis of the degree of change in the MR. Therefore, it is possible to reduce the consumption of resources.

Next, an example of the operation of the wireless communication system 1 including the wireless terminal 4 and the wireless base station 2 having the above-mentioned structure will be described.

(1.5) Example of Operation of Wireless Communication System 1

First, as illustrated in FIG. 9, the wireless base station 2 transmits the RRC connection reconfiguration message to the wireless terminal 4 such that settings for the MR can be transmitted to the wireless terminal 4 (Step S10). The RRC connection reconfiguration message includes a measurement report configuration message including setting information about the MR.

The RRC connection reconfiguration message is transmitted when the wireless terminal 4 is connected to the wireless communication system 1, when the settings for the MR are changed, or at the time when the wireless terminal 4 is handed over from the serving cell A to other cells B and C.

When receiving the RRC connection reconfiguration message from the wireless base station 2, the wireless terminal 4 refers to settings for measurement conditions, the notification (transmission) conditions of the MR, and the content of the report which are included in the measurement report configuration message.

Then, the wireless terminal 4 measures the received power or the reception quality (Ms) of the serving cell A and the received power or the reception quality (MnB and MnC) of adjacent cells B and C on the basis of various settings included in the measurement report configuration message.

Then, the wireless terminal 4 transmits the MR including the measurement result to the wireless base station 2 on the basis of the notification (transmission) conditions of the MR included in the measurement report configuration message and information indicating whether the class of the indicator (Mn−Ms) is changed to a different class.

FIG. 10 illustrates an example of the content of the measurement report configuration message.

As illustrated in FIG. 10, the measurement report configuration message includes three parts, that is, a measurement target module (MeasObjectMod), a report configuration module (ReportConfigMod), and a measurement ID module (MeasIDMod).

MeasObjectMod includes information about a cell of measurement target. For example, MeasObjectMod includes an ID (measObjectID) for identifying each setting and a list (CellsModList) of information about a cell adjacent to the cell of measurement target.

CellsModList includes information (CellsMod) about adjacent cells. In addition, each information item CellsMod includes an ID (CellID) for identifying a cell and a margin value (MRmargin) related to the transmission conditions of the MR.

In addition, ReportConfigMod includes setting information about the transmission conditions of the MR and the content of the report. For example, ReportConfigMod includes an ID (reportConfigID) for identifying each setting, designation (triggerQuantity) about whether to refer to the received power or the reception quality as the transmission conditions of the MR, and information (reportQuantity) about whether triggerQuantity is designated (received power or reception quality) or both the received power and the reception quality are designated as the content of the transmitted MR.

ReportConfigMod includes, for example, the above-mentioned MR transmission conditions (event), TTT (timeToTrigger), and the unit of control (management unit width) (valueStepSize) as an example of information about the class.

That is, the information about the class may include information about a width of the class.

MeasIDMod applies ReportConfigMod, which is the setting information of the MR, to MeasObjectMod, which is measurement target information. MeasIDMod includes its own ID (MeasID), the ID of MeasObjectMod (MeasObjectID), and the ID of ReportConfigMod (ReportConfigID).

Figure 11:
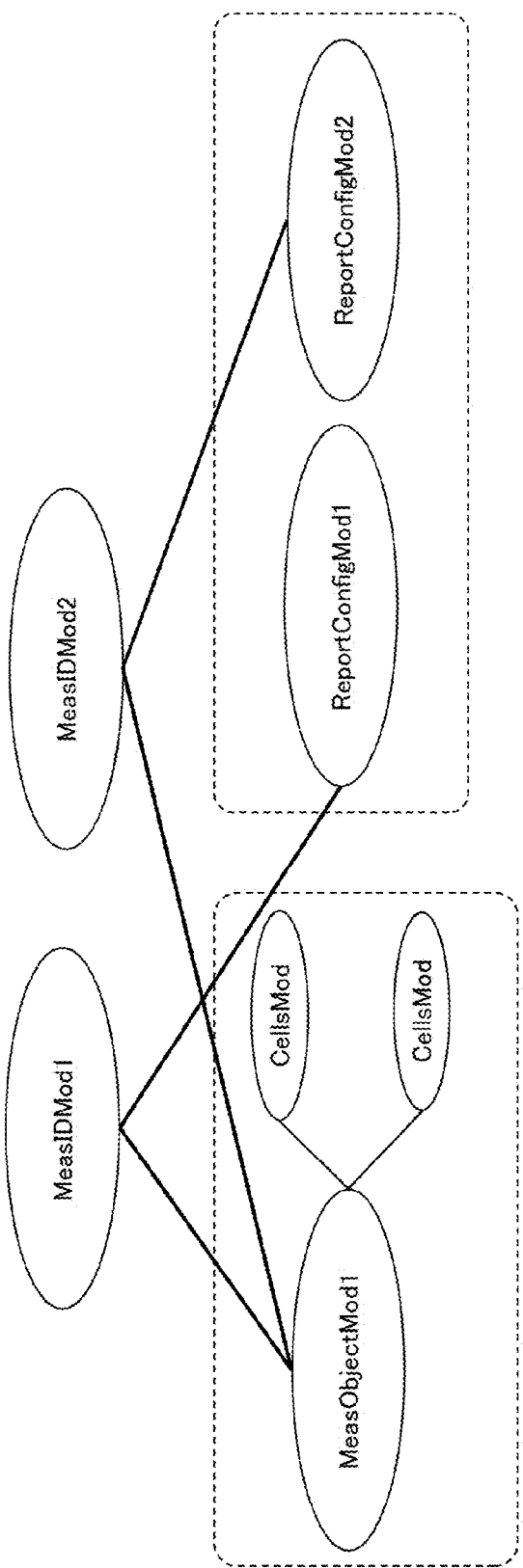
FIG. 11 is a diagram illustrating an example of the relation among MeasObjectMod, ReportConfigMod, and MeasID-Mod.

FIG. 11 illustrates an example of the setting of MeasObjectMod, ReportConfigMod, MeasIDMod, and CellsMod.

As illustrated in FIG. 11, MeasIDMod1 applies ReportConfigMod1 to MeasObjectMod1 and MeasIdMod2 applies ReportConfigMod2 to MeasObjectMod1. As such, a plurality of ReportConfigMods can be set to each MeasObjectMod.

The wireless terminal 4 measures the reception quality or the received power (Ms) of the serving cell A and the reception quality or the received power (MnB and MnC) of adjacent cells B and C on the basis of the measurement report configuration message. In addition, the wireless terminal 4 transmits the MR including the measurement result to the wireless base station 2 on the basis of the notification (transmission) conditions of the MR included in the measurement report configuration message and information indicating whether the class of the indicator (Mn−Ms) is changed to a different class.

Figure 12:
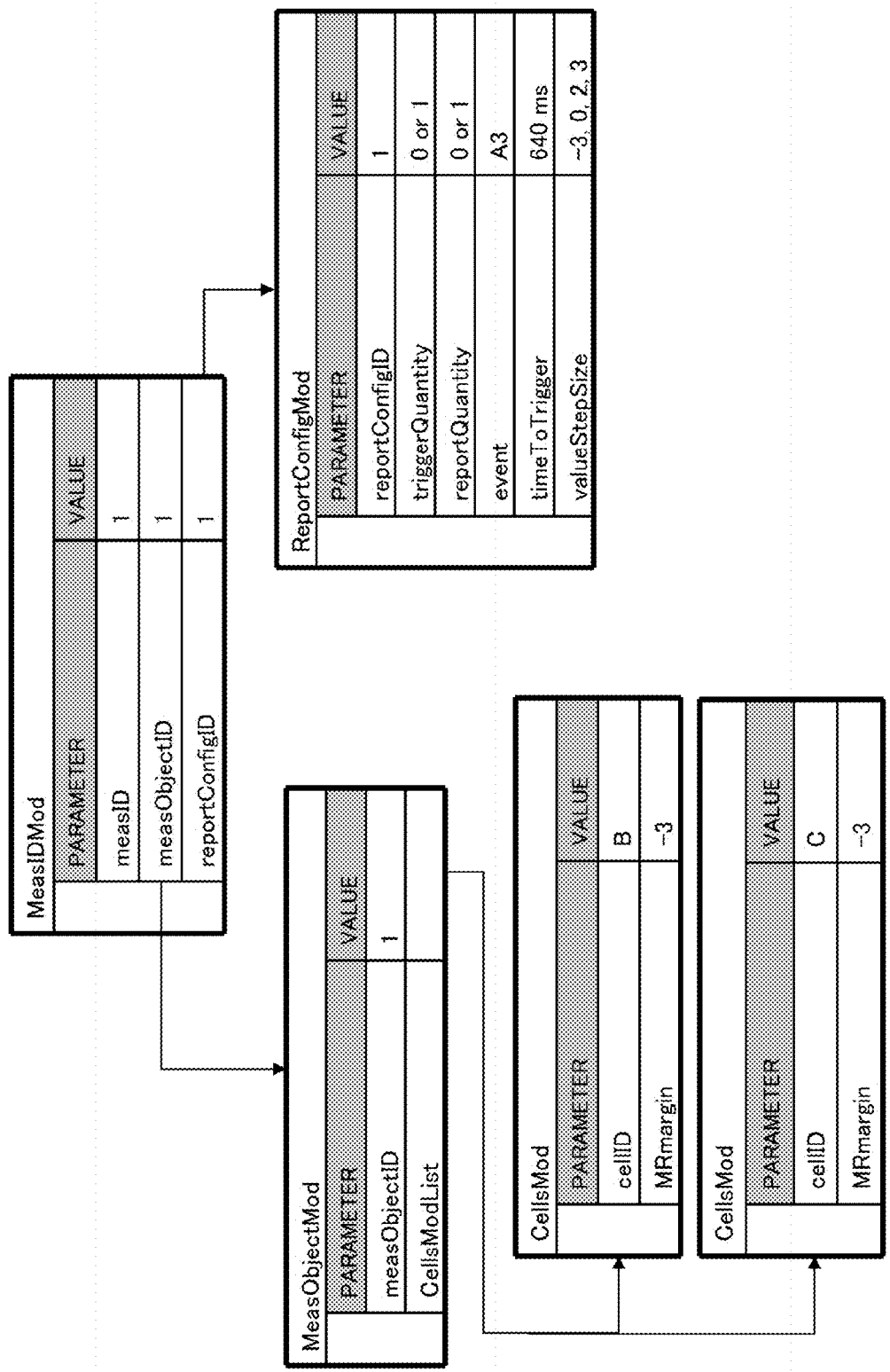
FIG. 12 is a diagram illustrating an example of the measurement report configuration message.

FIG. 12 illustrates an example of the measurement report configuration message which is transmitted from the wireless base station 2-1 to the wireless terminal 4 connected to the host wireless base station 2-1.

As illustrated in FIG. 12, the settings of an adjacent cell B (cellID=B) and an adjacent cell C (cellID=C) are described in CellsMod in CellsModList of MeasObjectMod. In the example illustrated in FIG. 12, MRmargin for the cell B and MRmargin for the cell C are set to −3 [dB]. In ReportConfigMod for MeasObjectMod, triggerQuantity is set to '0' (setting in which the received power is referred to as the reporting conditions) or '1' (setting in which the reception quality is referred to as the reporting conditions). In addition, reportQuantity is set to '0' (setting in which same information as triggerQuantity is reported) or '1' (setting in which the received power and the reception quality are reported).

In ReportConfigMod, for example, an event is set to Event A3, described above, and timeToTrigger is set to 640 [ms].

In addition, in ReportConfigMod, for example, valueStepSize is set to −3 [dB], 0 [dB], 2 [dB], and 3 [dB]. Furthermore, valueStepSize is an example of the settings when the management table illustrated in FIG. 8 is used. For example, when the management table illustrated in FIG. 5 is used, valueStepSize is set to −2 [dB], −1 [dB], 0 [dB], and 1 [dB].

FIG. 13 illustrates an example of the content of the measurement report.

As illustrated in FIG. 13, the measurement report includes MeasResults, which is information about the measurement result. MeasResults includes measID, measResultServCell, and measResultNeighCells.

MeasID corresponds to MeasID of MeasIDMod in the measurement report configuration message illustrated in FIG. 10. Therefore, the wireless terminal 4 designates the measurement result corresponding to MeasID in the measurement report configuration message using MeasID and transmits the MR.

In addition, measResultServCell includes information about at least one of the received power (rsrpResult) and the reception quality (rsrgResult) of the serving cell A. Furthermore, measeResultNeighCell includes at least one of the IDs (phyCellId) of adjacent cells B and C and the received power (rsrpResult) and the reception quality (rsrgResult) of the adjacent cells B and C. As described above, reportQuantity in the measurement report configuration message designates (sets) whether information included in the MR is the received power, the reception quality, or both the received power and the reception quality.

In this example, the wireless terminal 4 which is connected to the wireless base station 2-1 forming the cell A determines whether the class of the indicator (Mn−Ms) which is measured and calculated by the host wireless terminal 4 is changed from one class to another class among the classes managed by the wireless base station 2-1 on the basis of the measurement report configuration message illustrated in FIG. 12. When it is determined that the indicator (Mn−Ms) is changed, the wireless terminal 4 transmits the MR to the wireless base station 2-1.

On the other hand, when it is determined that the indicator (Mn−Ms) which is measured and calculated by the wireless terminal 4 is not changed from one class to another class among the classes managed by the wireless base station 2-1, the wireless terminal 4 does not transmit the MR to the wireless base station 2-1.

At least one (Ms) of the received power and the reception quality of the serving cell A and at least one (MnB or MnC) of the received power and the reception quality of the adjacent cells B and C are set to MeasResults in the MR transmitted to the wireless base station 2-1. For example, a management unit position (valueStepLoc) indicating the class including the indicator (Mn−Ms), which is measured and calculated by the wireless terminal 4, among the classes in the management table managed by the wireless base station 2-1 may be set to MeasResults in the MR.

Information about adjacent cells in a measResultNeighCells list may be information about all cells adjacent to the serving cell, information about only an adjacent cell satisfying the transmission conditions of the MR, or information about only an adjacent cell in which a change in the received power or the reception quality is equal to or more than a management unit width (valueStepSize).

Figure 14:
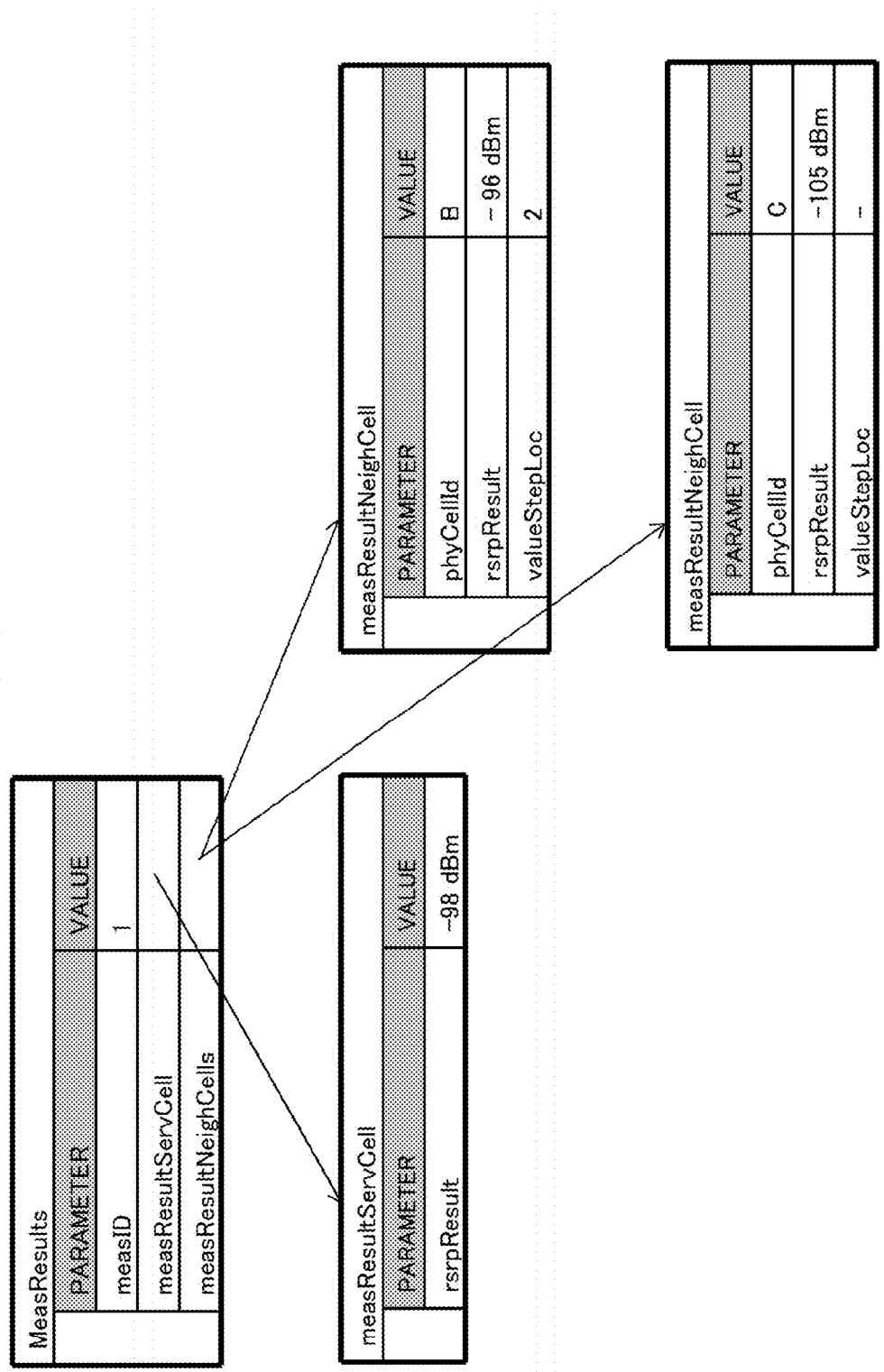
FIG. 14 is a diagram illustrating an example of the content of the measurement report.

FIG. 14 illustrates an example of the MR which is transmitted from the wireless terminal 4 in the cell A as the serving cell to the wireless base station 2-1 forming the cell A.

In this example, for example, when the adjacent cell B satisfies the transmission conditions of the MR and a change in the indicator (MnB−Ms) is more than the management unit width, the wireless terminal 4 transmits the MR to the wireless base station 2-1.

In the example illustrated in FIG. 14, the MR including the received power (rsrpResult) is transmitted. In addition, the MR includes information about the position of the management unit width (valueStepLoc) relative to the adjacent cell B. In addition, valueStepLoc is 2, which indicates that, for example, the measured value (Mn−Ms) of the wireless terminal 4 with respect to Event A3 of the serving cell A and the adjacent cell B is equal to or greater than 2 [dB] and is less than 3 [dB].

Figure 15:
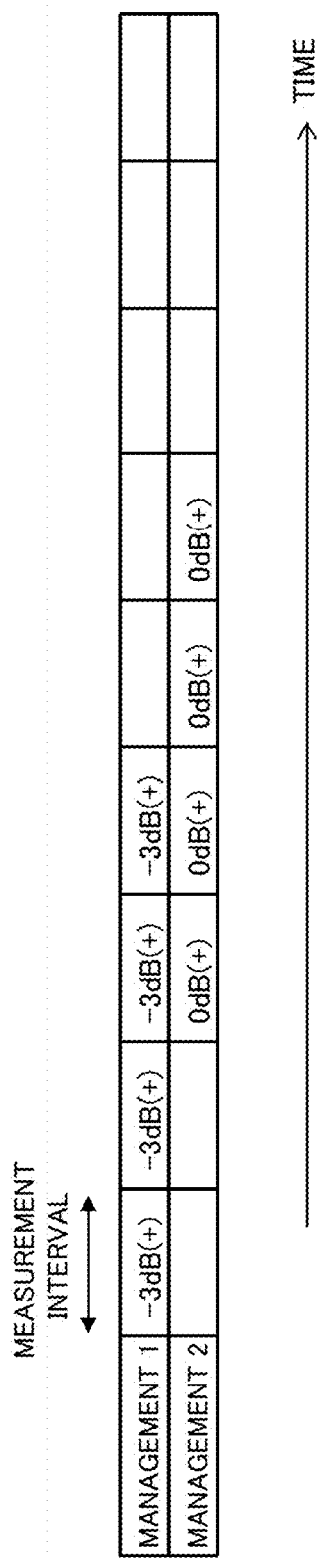
FIG. 15 is a diagram illustrating an example of a measurement management table of the wireless terminal.

FIG. 15 illustrates an example of the measurement management table of the serving cell and adjacent cells which is managed by the memory 52 of the wireless terminal 4.

The measurement management tables, which are illustrated in FIG. 15, corresponding to the number of cells adjacent to the serving cell are prepared. The measurement management table is updated whenever the wireless terminal 4 measures the reception quality or received power of the serving cell and the adjacent cells. A detailed method for updating the measurement management table will be described below.

Figure 16:
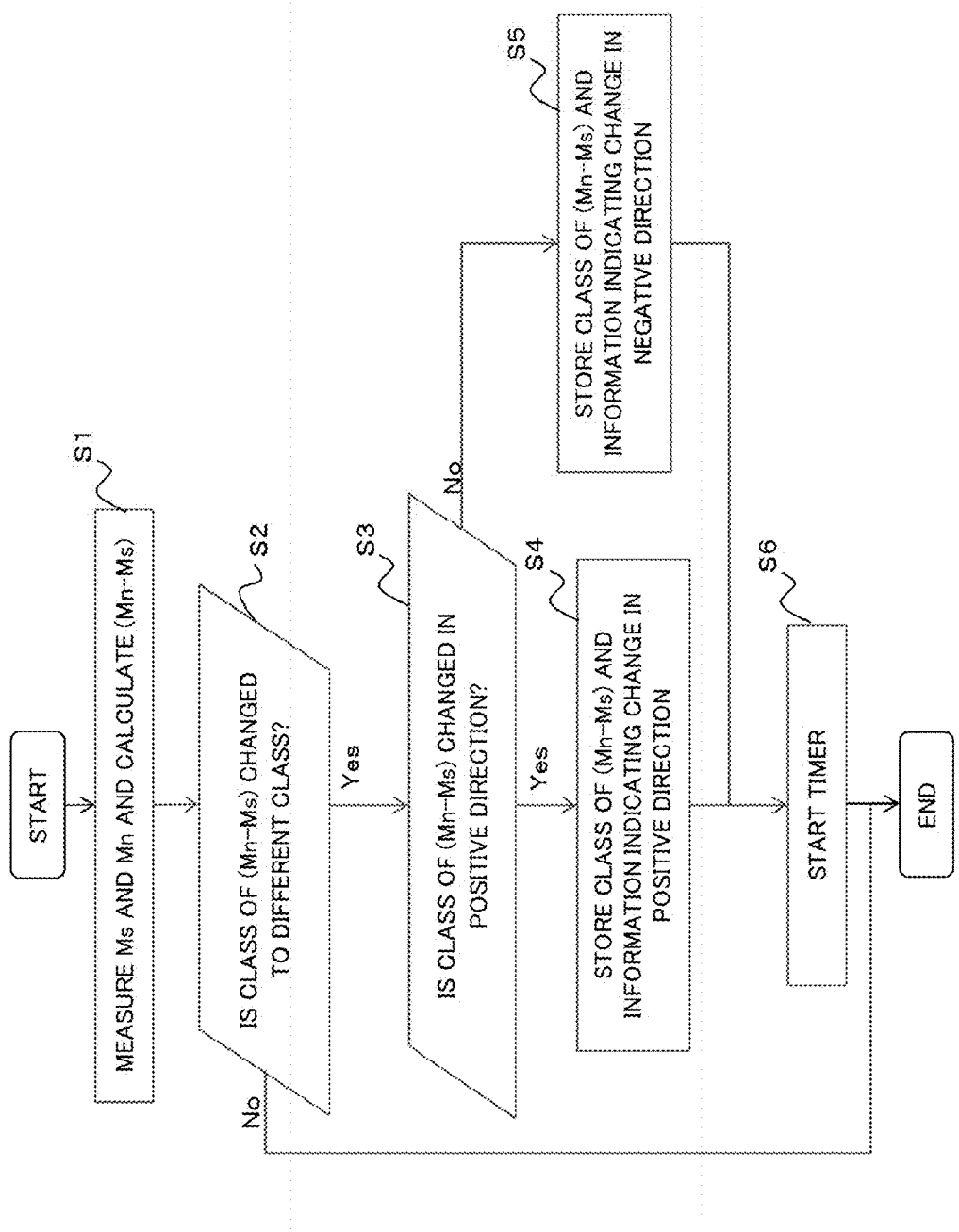
FIG. 16 is a flowchart illustrating an example of the operation of the wireless terminal.

FIG. 16 illustrates an example of the flow of the process of the wireless terminal 4 determining whether to start the management of the measurement result of the reception quality or received power of the serving cell and the adjacent cells.

As illustrated in FIG. 16, first, the wireless terminal 4 measures the reception quality or the received power (Ms) of the serving cell and the reception quality or the received power (Mn) of the adjacent cells and calculates the indicator (Mn−Ms) (Step S1).

The wireless terminal 4 compares the indicator (Mn−Ms) calculated in Step S1 with the class including the current indicator and determines whether the class of the indicator (Mn−Ms) calculated in Step S1 is changed to a different class (Step S2).

When it is determined that the class of the indicator (Mn−Ms) is changed to a different class (a 'Yes' route in Step S2), the wireless terminal 4 starts the management of the measurement result. On the other hand, when it is determined that the indicator (Mn−Ms) belongs to the same class (a 'No' route in Step S2), the wireless terminal 4 ends the process.

For example, as illustrated in FIG. 8, when each class in the management table is −3 [dB], 0 [dB], 2 [dB], and 3[dB] and the previously calculated value of (Mn−Ms) is equal to or greater than −3 [dB] and less than 0 [dB] and the currently calculated value of (Mn−Ms) is equal to or greater than 0 [dB] and less than 2 [dB], the wireless terminal 4 determines that a change in the indicator (Mn−Ms) is equal to or more than the management unit width and starts management.

In this case, the wireless terminal 4 may manage information about the change direction in addition to the current class to which the indicator (Mn−Ms) belongs, that is, the position (for example, a class of 0 [dB]) of the management unit width.

For example, when the value of (Mn−Ms) is changed from the range of −3 [dB] to 0 [dB] (a class of −3 [dB]) to the range of 0 [dB] to 2 [dB] (a class of 0 [dB]), the wireless terminal 4 may manage information indicating that there is a change in the positive direction. When there is a change in the opposite direction, the wireless terminal 4 may manage information indicating that there is a change in the negative direction.

That is, when the class of the indicator (Mn−Ms) is changed to a different class, the wireless terminal 4 determines whether the change direction is the positive direction (Step S3). When it is determined that the change direction is the positive direction (a 'Yes' route in Step S3), the wireless terminal 4 manages the current class of the indicator (Mn−Ms) and information indicating a change in the positive direction (Step S4).

On the other hand, when the change direction is the negative direction (a 'No' route in Step S3), the wireless terminal 4 manages the current class of the indicator (Mn−Ms) and information indicating a change in the negative direction (Step S5).

After Step S4 or Step S5, the wireless terminal 4 starts a timer for TTT (Step S6). The timer function may be implemented by the controller 51 or by adding a timer to the structure of the wireless terminal 4 illustrated in FIG. 7.

Figure 17:
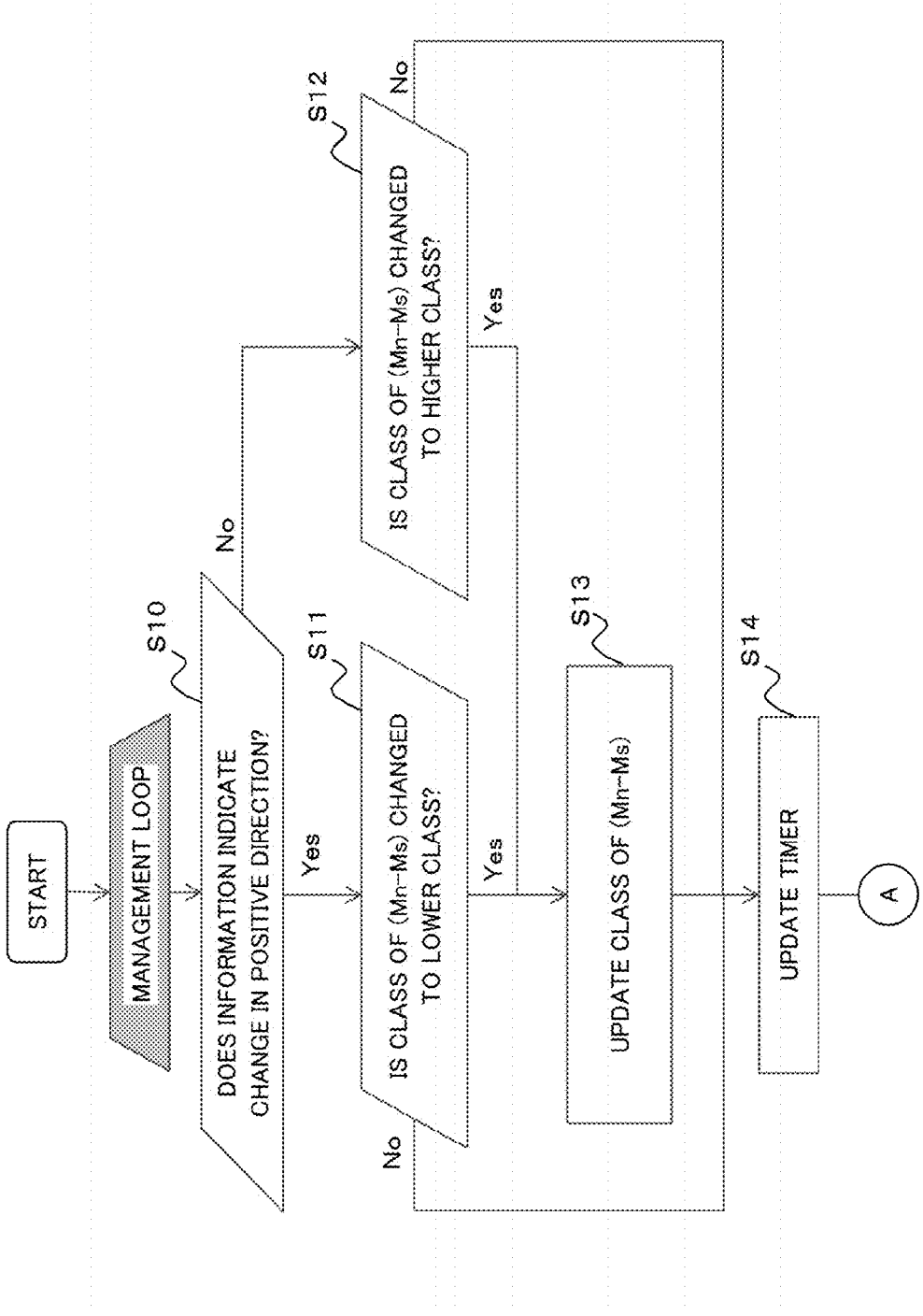
FIG. 17 is a flowchart illustrating an example of the operation of the wireless terminal.

FIG. 17 illustrates an example of the flow of a process for updating management information managed by the wireless terminal 4.

As illustrated in FIG. 17, first, the wireless terminal 4 determines whether the management information is information about the positive direction (Step S10).

When it is determined that the management information is information about the positive direction (a 'Yes' route in Step S10), the wireless terminal 4 determines whether the class of the indicator (Mn−Ms) is changed to a lower class (Step S11).

When it is determined that the class of the indicator (Mn−Ms) is changed to a lower class (a 'Yes' route in Step S11), the wireless terminal 4 updates the class of the indicator (Mn−Ms) (Step S13) and updates the timer (Step S14).

For example, when the previously calculated indicator (Mn−Ms) is equal to or greater than 0 [dB] and less than 2 [dB] and the currently calculated indicator (Mn−Ms) is equal to or greater than −3 [dB] and less than 0 [dB], wireless terminal 4 updates the class of the indicator (Mn−Ms) to a class of −3 [dB] to 0 [dB].

When it is determined in Step S10 that the management information is information about the negative direction (a 'No' route in Step S10), the wireless terminal 4 determines whether the class of the indicator (Mn−Ms) is changed to a higher class (Step S12).

When it is determined that the class of the indicator (Mn−Ms) is changed to a higher class (a 'Yes' route in Step S12), the wireless terminal 4 updates the class of the indicator (Mn−Ms) (Step S13) and updates the timer (Step S14).

For example, when the previously calculated indicator (Mn−Ms) is equal to or greater than −3 [dB] and less than 0 [dB] and the currently calculated indicator (Mn−Ms) is equal to or greater than 0 [dB] and less than 2 [dB], the wireless terminal 4 updates the class of the indicator (Mn−Ms) to a class of 0 [dB] to 2 [dB].

When it is determined in Steps S11 and S12 that the class of the indicator (Mn−Ms) is maintained (a 'No' route in Step S11 and a 'No' route in Step S12), the wireless terminal 4 does not update the class of the indicator (Mn−Ms) and updates the timer (Step S14).

As described above, in this embodiment, the wireless terminal 4 can transmit the MR, considering, for example, the conditions of TTT. For example, when the class of the previously calculated indicator (Mn−Ms) is changed in the positive direction and the currently calculated indicator (Mn−Ms) is reduced, the wireless terminal 4 determines that the previous status is not maintained and lowers the class of the currently calculated indicator (Mn−Ms).

For example, when the class of the previously calculated indicator (Mn−Ms) is changed in the negative direction and the currently calculated indicator (Mn−Ms) increases, the wireless terminal 4 determines that the previous status is not maintained and raises the class of the currently calculated indicator (Mn−Ms).

When the class of the previously calculated indicator (Mn−Ms) is changed in the positive direction and the currently calculated indicator (Mn−Ms) increases or when the class of the previously calculated indicator (Mn−Ms) is changed in the negative direction and the currently calculated indicator (Mn−Ms) is reduced, the wireless terminal 4 does not update the class of the indicator (Mn−Ms).

When an increase or decrease in the indicator (Mn−Ms) is equal to or more than the management unit width, the wireless terminal 4 starts the management of new management information, as illustrated in FIG. 16.

Figure 18:
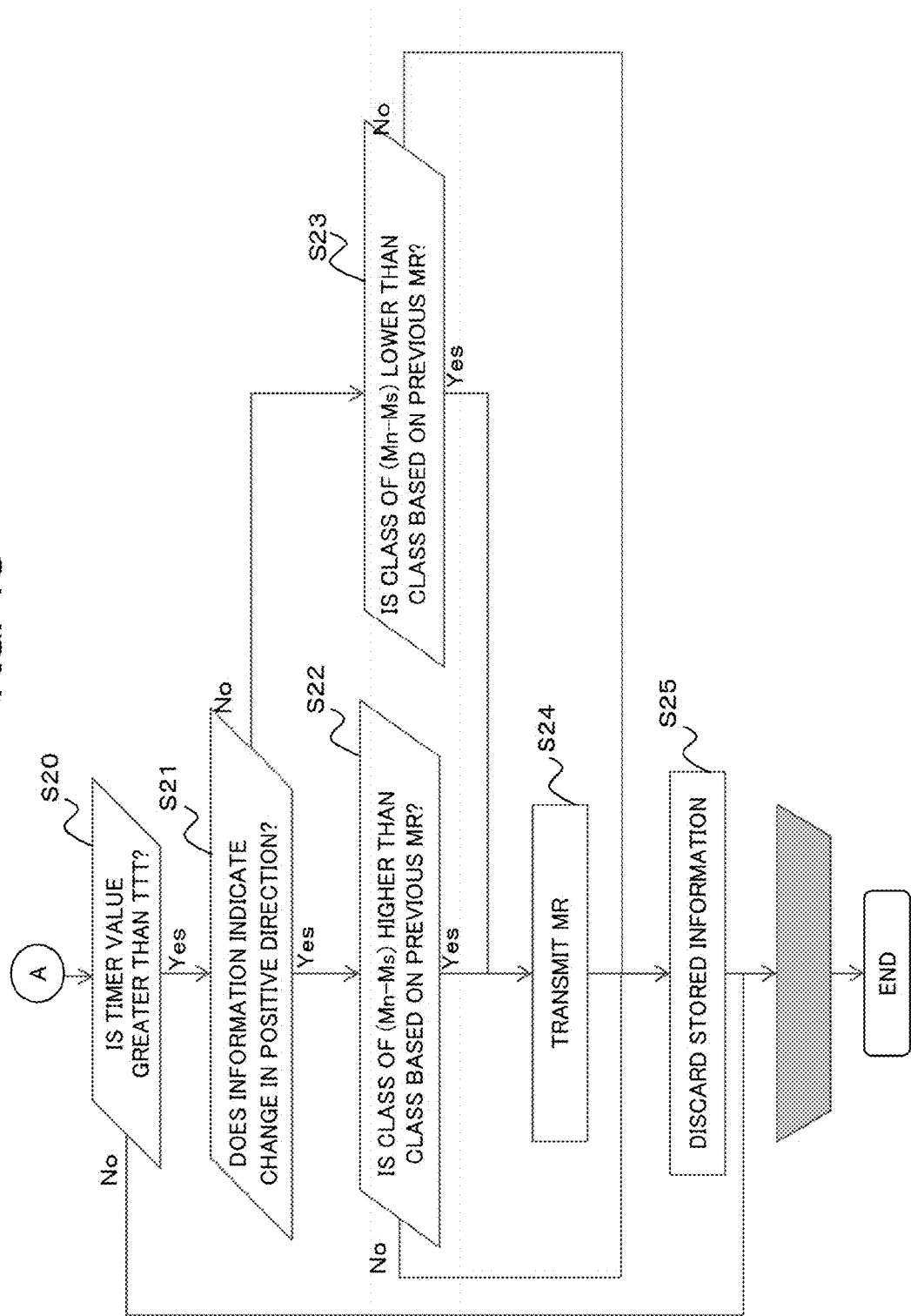
FIG. 18 is a flowchart illustrating an example of the operation of the wireless terminal.

Then, as illustrated in FIG. 18, the wireless terminal 4 determines whether the timer value is equal to or greater than TTT (for example, 640 [ms]) (Step S20).

When it is determined that the timer value is equal to or less than TTT (a 'No' route in Step S20), the wireless terminal 4 ends the process.

On the other hand, when it is determined that the timer value is greater than TTT (a 'Yes' route in Step S20), the wireless terminal 4 compares the indicator of (Mn−Ms) and the currently calculated indicator of (Mn−Ms) on the basis of the previously transmitted MR.

For example, the wireless terminal 4 determines whether the management information is information about the positive direction (Step S21). When it is determined that the management information is information about the positive direction (a 'Yes' route in Step S21), the wireless terminal 4 determines whether the class of the currently calculated indicator (Mn−Ms) is higher than the class of the indicator (Mn−Ms) which is calculated on the basis of the previously transmitted MR (Step S22).

When it is determined that the class of the currently calculated indicator (Mn−Ms) is higher than the class of the indicator (Mn−Ms) which is calculated on the basis of the previously transmitted MR (a 'Yes' route in Step S22), the wireless terminal 4 transmits the MR including the currently measured Mn and Ms to the wireless base station 2 (Step S24) and discards the corresponding management information (Step S25).

On the other hand, when it is determined that the class of the currently calculated indicator (Mn−Ms) is lower than the class of the indicator (Mn−Ms) which is calculated on the basis of the previously transmitted MR (a 'No' route in Step S22), the wireless terminal 4 does not transmit the MR including the currently measured Mn and Ms to the wireless base station 2 and discards the corresponding management information (Step S25).

When it is determined that the management information is information about the negative direction (a 'No' route in Step S21), the wireless terminal 4 determines whether the class of the currently calculated indicator (Mn−Ms) is lower than the class of the indicator (Mn−Ms) which is calculated on the basis of the previously transmitted MR (Step S23).

When it is determined that the class of the currently calculated indicator (Mn−Ms) is lower than the class of the indicator (Mn−Ms) which is calculated on the basis of the previously transmitted MR (a 'Yes' route in Step S23), the wireless terminal 4 transmits the MR including the currently measured Mn and Ms to the wireless base station 2 (Step S24) and discards the corresponding management information (Step S25).

On the other hand, when it is determined that the class of the currently calculated indicator (Mn−Ms) is higher than the class of the indicator (Mn−Ms) which is calculated on the basis of the previously transmitted MR (a 'No' route in Step S23), the wireless terminal 4 does not transmit the MR including the currently measured Mn and Ms to the wireless base station 2 and discards the corresponding management information (Step S25).

Steps S10 to S25 are repeatedly performed for each management information item (management loop).

FIG. 19 illustrates a specific example of the management of the measurement result and the transmission of the MR by the wireless terminal 4 on the basis of each of the above-mentioned processes.

As illustrated in FIG. 19, first, the wireless terminal 4 starts first management (management 1; the positive direction) on the basis of the measurement result indicating that the indicator (Mn−Ms) is equal to or greater than −3 [dB] and less than 0 [dB].

Then, when the measurement result indicates that the indicator (Mn−Ms) is equal to or greater than 0 [dB] and less than 2 [dB], the wireless terminal 4 starts second new management (management 2; the positive direction).

For management 1, the class of the newly calculated indicator (Mn−Ms) is higher than the previous class, but the class is not updated.

Then, when the measurement result indicates that the indicator (Mn−Ms) is equal to or greater than 2 [dB] and less than 3 [dB], the wireless terminal 4 starts third new management (management 3; the positive direction).

In management 1, when the indicator (Mn−Ms) is maintained in the range of −3 [dB] to 0 [dB] for TTT, the wireless terminal 4 transmits the MR to the wireless base station 2.

Similarly, in management 2, when the indicator (Mn−Ms) is maintained in the range of 0 [dB] to 2 [dB] for TTT, the wireless terminal 4 transmits the MR to the wireless base station 2.

In contrast, in management 3, when the timer value is less than TTT, the class of the indicator (Mn−Ms) is reduced. In this case, the wireless terminal 4 manages a lower class (in the range of 0 [dB] to 2 [dB]) in management 3.

At the same time, the wireless terminal 4 starts fourth new management (management 4; the negative direction) for a lower class (in the range of 0 [dB] to 2 [dB]).

In management 3, when the timer value is equal to or greater than TTT, the wireless terminal 4 determines whether the transmission of the MR is available. Since the MR has been transmitted in the above-mentioned class (in the range of 0 [dB] to 2 [dB]), the wireless terminal 4 discards management 3.

For management 4, the indicator (Mn−Ms) is changed to a higher class. In this case, the wireless terminal 4 manages a higher class (in the range of 2 [dB] to 3 [dB]) in management 4.

At the same time, the wireless terminal 4 starts fifth new management (management 5; the positive direction) for a higher class (in the range of 2 [dB] to 3 [dB]).

In management 4, when the timer value is equal to or greater than TTT, the wireless terminal 4 determines whether the transmission of the MR is available. However, since management 4 includes information about the negative direction and the class of the current indicator (Mn−Ms) is higher than the class of the previous indicator (Mn−Ms), the wireless terminal 4 discards management 4.

As described above, according to this embodiment, the wireless terminal 4 transmits (sends) the MR to the wireless base station 2 when it is determined that the class of the indicator (Mn−Ms) is changed to a different class on the basis of the information about the classes which is received from the wireless base station 2 and does not transmit the MR to the wireless base station 2 when it is determined that the indicator (Mn−Ms) is not changed. Therefore, it is possible to suppress the transmission of the MR and reduce the consumption of resources.

(1.6) Example of Hardware Configuration

Figure 20:
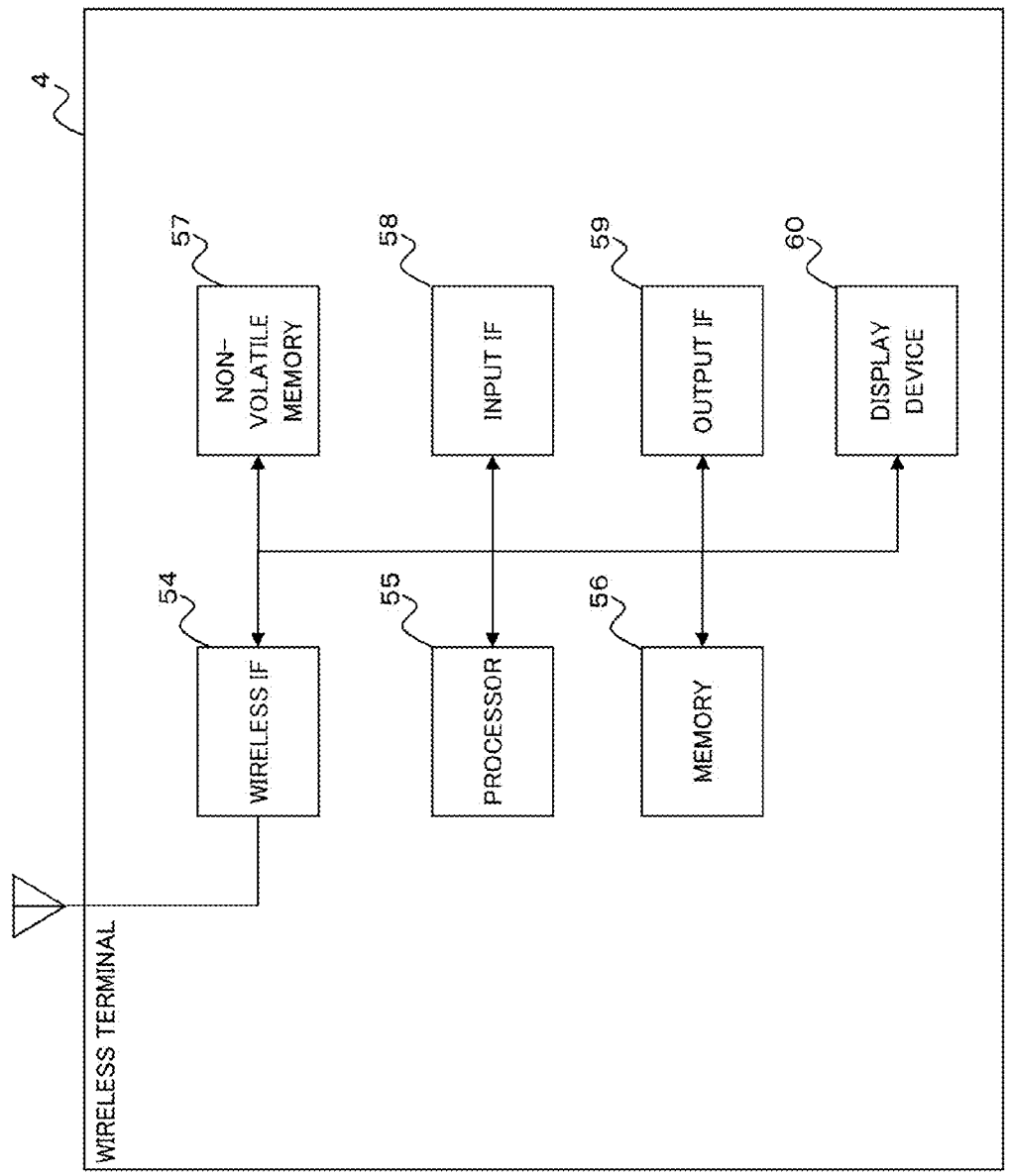
FIG. 20 is a diagram illustrating an example of the hardware configuration of the wireless terminal.

FIG. 20 illustrates an example of the hardware configuration of the wireless terminal 4.

A wireless (interface) IF 54 is an interface device for wireless communication with the wireless base station 2. A processor 55 is a device which processes data and includes, for example, a central processing unit (CPU) or a digital signal processor (DSP). A memory 56 is a device which stores data and includes, for example, a read only memory (ROM) or a random access memory (RAM). A non-volatile memory 57 is a memory which holds data even when no power is supplied and includes, for example, a mask ROM, a programmable ROM (PROM), an erasable PROM (EPROM), a flash memory, or a magnetic RAM (MRAM). An input IF 58 is a device which inputs data and includes, for example, an operation button or a microphone. An output IF 59 is a device which outputs data and includes, for example, a speaker. A display device 60 is a device which displays images and includes, for example, a display.

The correspondence between each component of the wireless terminal 4 illustrated in FIG. 7 and each component of the wireless terminal 4 illustrated in FIG. 20 is, for example, as follows.

For example, the wireless IF 54 corresponds to the antenna 41, the duplexer 42, a portion of the receiver 43, and a portion of the transmitter 50. The processor 55, the memory 56, and the non-volatile memory 57 correspond to, for example, a portion of the receiver 43, the controller 51, the memory 52, and a portion of the transmitter 50. The memory 56 corresponds to the buffer 48. The processor 55, the memory 56, the non-volatile memory 57, the output IF 59, and the display device 60 correspond to, for example, the application unit 46. The processor 55 and the memory 56 correspond to, for example, the control message extractor 44, the data generator 45, the identifier 47, the PDU generator 49, and the control message generator 53.

Figure 21:
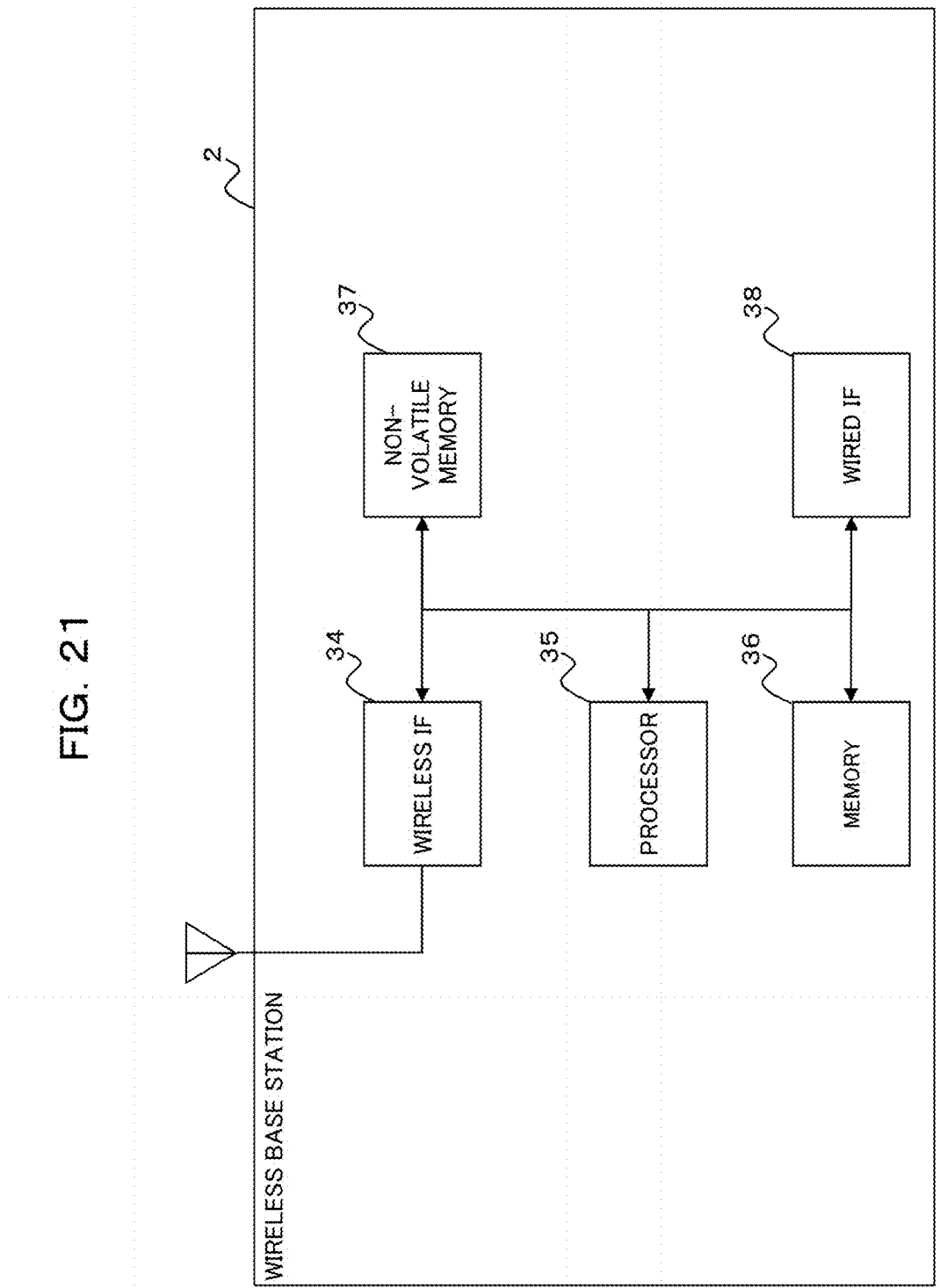
FIG. 21 is a diagram illustrating an example of the hardware configuration of the wireless base station.

FIG. 21 illustrates an example of the hardware configuration of the wireless base station 2.

A wireless IF 34 is an interface device for wireless communication with the wireless terminal 4. A processor 35 is a device which processes data and includes, for example, a CPU or a DSP. A memory 36 is a device which stores data and includes, for example, a ROM or a RAM. A non-volatile memory 37 is a memory which holds data even when no power is supplied and includes, for example, a mask ROM, a PROM, an EPROM, a flash memory, or an MRAM. A wired IF 38 is an interface device for wired communication with other wireless base stations which are connected to the network (so-called backhaul network) of the mobile phone system.

The correspondence between each component of the wireless base station 2 illustrated in FIG. 6 and each component of the wireless base station 2 illustrated in FIG. 21 is, for example, as follows.

The wireless IF 34 corresponds to, for example, the antenna 21, the duplexer 22, a portion of the receiver 23, and a portion of the transmitter 30. The processor 35, the memory 36, and the non-volatile memory 37 correspond to, for example, a portion of the receiver 23, the controller 31, and a portion of the transmitter 30. The wired IF 38 corresponds to, for example, the network IF 26. The processor 35 and the memory 36 correspond to, for example, the control message extractor 24, the data generator 25, the identifier 27, the PDU generator 29, and the control message generator 33. The memory 36 corresponds to, for example, the buffer 28.

[2] Others

The components and functions of the wireless base station 2 and the wireless terminal 4 according to the above-described embodiment may be selected or appropriately combined with each other, if necessary. That is, the components and functions may be selected or appropriately combined with each other such that the functions of the invention are implemented.

For example, in the above-described embodiment, the wireless base station 2 transmits information including the width of each class as the information about the classes to the wireless terminal 4. However, for example, the wireless base station 2 may transmit, to the wireless terminal 4, information which enables the wireless terminal 4 to determine whether an indicator for handover belongs to a different class in the wireless base station 2.

For example, the wireless base station 2 may transmit, to the wireless terminal 4, information about the width of each class and information about the classes of the indicator for handover. For example, the wireless base station 2 may transmit information including the value of each class to the wireless terminal 4.

In the above-described embodiment, for example, (Mn−Ms) which is calculated from Mn and Ms in the MR is used as the indicator used to determine a handover. However, other indicators may be used to determine a handover.

According to the embodiment, it is possible to reduce the consumption of resources.

All examples and conditional language provided herein are intended for pedagogical purposes of aiding the reader in understanding the invention and the concepts contributed by the inventor to furthering the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication system comprising:
   a wireless terminal; and
   a wireless base station that wirelessly communicates with the wireless terminal,
   wherein the wireless base station includes:
   a first processor that manages a class of an indicator which is used to determine a handover for the wireless terminal; and
   a first transmitter that transmits information about classes to the wireless terminal, and
   the wireless terminal includes:
   a receiver that receives the information about the classes from the first transmitter;
   a second processor that determines whether the class of the indicator is changed to a different class on the basis of the received information about the classes; and
   a second transmitter that
      transmits information about the indicator to the wireless base station when it is determined that the class of the indicator is changed to the different class and when a first change direction matches with a second change direction, the first change direction being a direction of change in class of the indicator from a first class to a second class when the class of the indicator is changed from the first class to the second class before a predetermined period, the second change direction being a direction of change in class of the indicator from a class based on the information about the indicator in a previous transmission to a class based on the information about the indicator in a current transmission and
      does not transmit the information about the indicator to the wireless base station when it is determined that the class of the indicator is not changed or when the first change direction does not match with the second change direction.

2. The wireless communication system according to claim 1,
   wherein the information about the classes includes information about a width of each class, the width being a difference between a maximum value and a minimum value of the indicator in each class.

3. The wireless communication system according to claim 1,
   wherein the first processor determines the handover for the wireless terminal when the information about the indicator is greater than a certain threshold value, and the first processor changes the certain threshold value on the basis of a width of each class, the width being a difference between a maximum value and a minimum value of the indicator in each class.

4. The wireless communication system according to claim 1,
   wherein the classes have a same width in logarithm.

5. The wireless communication system according to claim 1,
   wherein the classes have different widths in logarithm.

6. The wireless communication system according to claim 1,
   wherein the indicator includes a reception quality or received power of a radio signal which is received by the wireless terminal from the wireless base station connected to the wireless terminal and a reception quality or received power of a radio signal which is received by the wireless terminal from another wireless base station adjacent to the wireless base station connected to the wireless terminal.

7. A method for controlling communication of the wireless terminal in the wireless communication system according to claim 1, the method comprising:
receiving the information about the classes from the wireless base station; and
transmitting the information about the indicator to the wireless base station when it is determined that the class of the indicator is changed to a different class on the basis of the received information about the classes and when a first change direction matches with a second change direction, the first change direction being a direction of change in class of the indicator from a first class to a second class when the class of the indicator is changed from the first class to the second class before a predetermined period, the second change direction being a direction of change in class of the indicator from a class based on the information about the indicator in a previous transmission to a class based on the information about the indicator in a current transmission and not transmitting the information about the indicator to the wireless base station when it is determined that the class of the indicator is not changed on the basis of the received information about the class or when the first change direction does not match with the second change direction.

8. A wireless base station comprising:
a processor that manages a class of an indicator which is used to determine a handover for a wireless terminal;
a transmitter that transmits information about classes to the wireless terminal; and
a receiver that
receives information about the indicator from the wireless terminal when the class of the indicator is changed to a different class and when a first change direction matches with a second change direction, the first change direction being a direction of change in class of the indicator from a first class to a second class when the class of the indicator is changed from the first class to the second class before a predetermined period, the second change direction being a direction of change in class of the indicator from a class based on the information about the indicator in a previous reception to a class based on the information about the indicator in a current reception and
does not receive the information about the indicator from the wireless terminal when the class of the indicator is not changed or when the first change direction does not match with the second change direction.

9. A wireless terminal that wirelessly communicates with a wireless base station which manages a class of an indicator used to determine a handover for the wireless terminal, the wireless terminal comprising:
a receiver that receives information about classes from the wireless base station;
a processor that determines whether the class of the indicator is changed to a different class on the basis of the received information about the classes; and
a transmitter that
transmits information about the indicator to the wireless base station when it is determined that the class of the indicator is changed to the different class and when a first change direction matches with a second change direction, the first change direction being a direction of change in class of the indicator from a first class to a second class when the class of the indicator is changed from the first class to the second class before a predetermined period, the second change direction being a direction of change in class of the indicator from a class based on the information about the indicator in a previous transmission to a class based on the information about the indicator in a current transmission and
does not transmit the information about the indicator to the wireless base station when it is determined that the class of the indicator is not changed or when the first change direction does not match with the second change direction.

10. A method for controlling wireless communication of a wireless base station with a wireless terminal, the method comprising:
managing a class of an indicator which is used to determine a handover for the wireless terminal;
transmitting information about classes to the wireless terminal; and
receiving information about the indicator from the wireless terminal when the class of the indicator is changed to a different class and when a first change direction matches with a second change direction, the first change direction being a direction of change in class of the indicator from a first class to a second class when the class of the indicator is changed from the first class to the second class before a predetermined period, the second change direction being a direction of change in class of the indicator from a class based on the information about the indicator in a previous reception to a class based on the information about the indicator in a current reception and not receiving the information about the indicator from the wireless terminal when the class of the indicator is not changed or when the first change direction does not match with the second change direction.

11. A method for controlling wireless communication of a wireless terminal with a wireless base station which manages a class of an indicator used to determine a handover for the wireless terminal, the method comprising:
receiving information about classes from the wireless base station;
determining that the class of the indicator is changed to a different class; and
transmitting information about the indicator to the wireless base station when it is determined that the class of the indicator is changed to the different class on the basis of the received information about the classes and when a first change direction matches with a second change direction, the first change direction being a direction of change in class of the indicator from a first class to a second class when the class of the indicator is changed from the first class to the second class before a predetermined period, the second change direction being a direction of change in class of the indicator from a class based on the information about the indicator in a previous transmission to a class based on the information about the indicator in a current transmission and not transmitting the information about the indicator to the wireless base station when it is determined that the class of the indicator is not changed on the basis of the received information about the classes or when the first change direction does not match with the second change direction.

* * * * *